(12) United States Patent
Koseki et al.

(10) Patent No.: US 8,803,993 B2
(45) Date of Patent: Aug. 12, 2014

(54) SOLID-STATE IMAGING DEVICE AND CAMERA SYSTEM WITH A RESET-LEVEL VARIATION CORRECTION FUNCTION

(75) Inventors: Ken Koseki, Kanagawa (JP); Yasuaki Hisamatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 80 days.

(21) Appl. No.: 12/929,470

(22) Filed: Jan. 27, 2011

(65) Prior Publication Data
US 2011/0205386 A1    Aug. 25, 2011

(30) Foreign Application Priority Data

Feb. 19, 2010  (JP) .................................. 2010-035416

(51) Int. Cl.
*H04N 5/228* (2006.01)
(52) U.S. Cl.
USPC .................................................... 348/222.1
(58) Field of Classification Search
USPC .................................................... 348/222.1
See application file for complete search history.

(56) References Cited

U.S. PATENT DOCUMENTS

| | | | |
|---|---|---|---|
| 6,163,342 A * | 12/2000 | Suzuki .......................... 348/364 |
| 7,129,883 B2 | 10/2006 | Muramatsu et al. |
| 7,623,173 B2 | 11/2009 | Nitta et al. |
| 2009/0033532 A1* | 2/2009 | Reshef et al. .................. 341/137 |
| 2009/0160971 A1* | 6/2009 | Jung et al. ................... 348/229.1 |

FOREIGN PATENT DOCUMENTS

| | | |
|---|---|---|
| JP | 2005-278135 | 10/2005 |
| JP | 2005-323331 | 11/2005 |

* cited by examiner

*Primary Examiner* — Usman Khan
(74) *Attorney, Agent, or Firm* — Rader, Fishman & Grauer PLLC

(57) ABSTRACT

A solid-state imaging device including: a pixel section formed by a matrix-like array of a plurality of pixels performing photoelectric conversion; and a pixel signal readout section reading out a pixel signal from the pixel section in units for reading each formed by a plurality of pixels, wherein the pixel signal readout section includes a column-parallel type ADC group formed by a plurality of analog-digital converters (ADCs) for performing A-D conversion of a pixel reset level, and a signal processing system, the signal processing system obtaining only an average value of results of A-D conversion of pixel reset levels for a plurality of pixels and automatically adjusting an input offset value for the conversion range of the ADCs such that the average value of pixel reset levels will be adequately positioned with respect to the A-D conversion range.

22 Claims, 19 Drawing Sheets

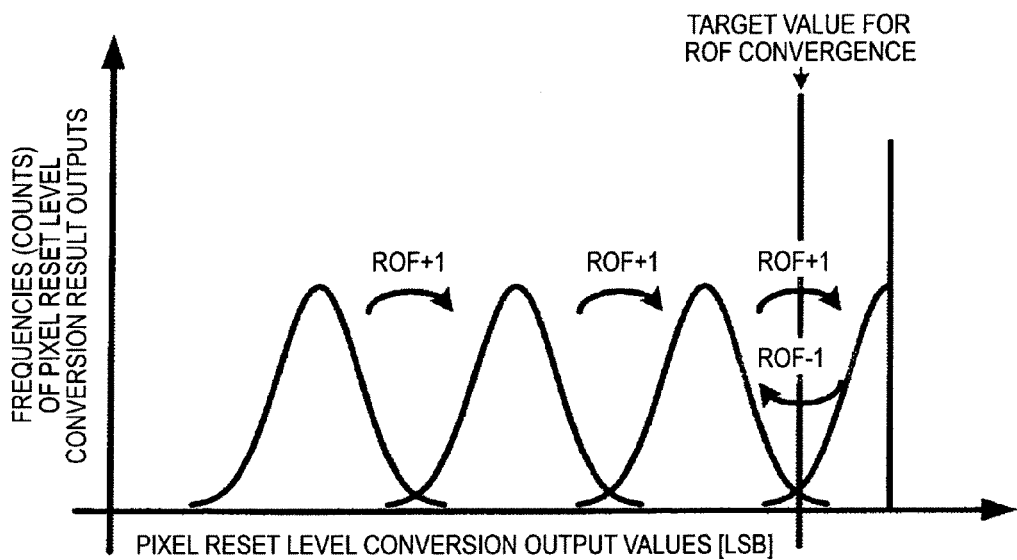

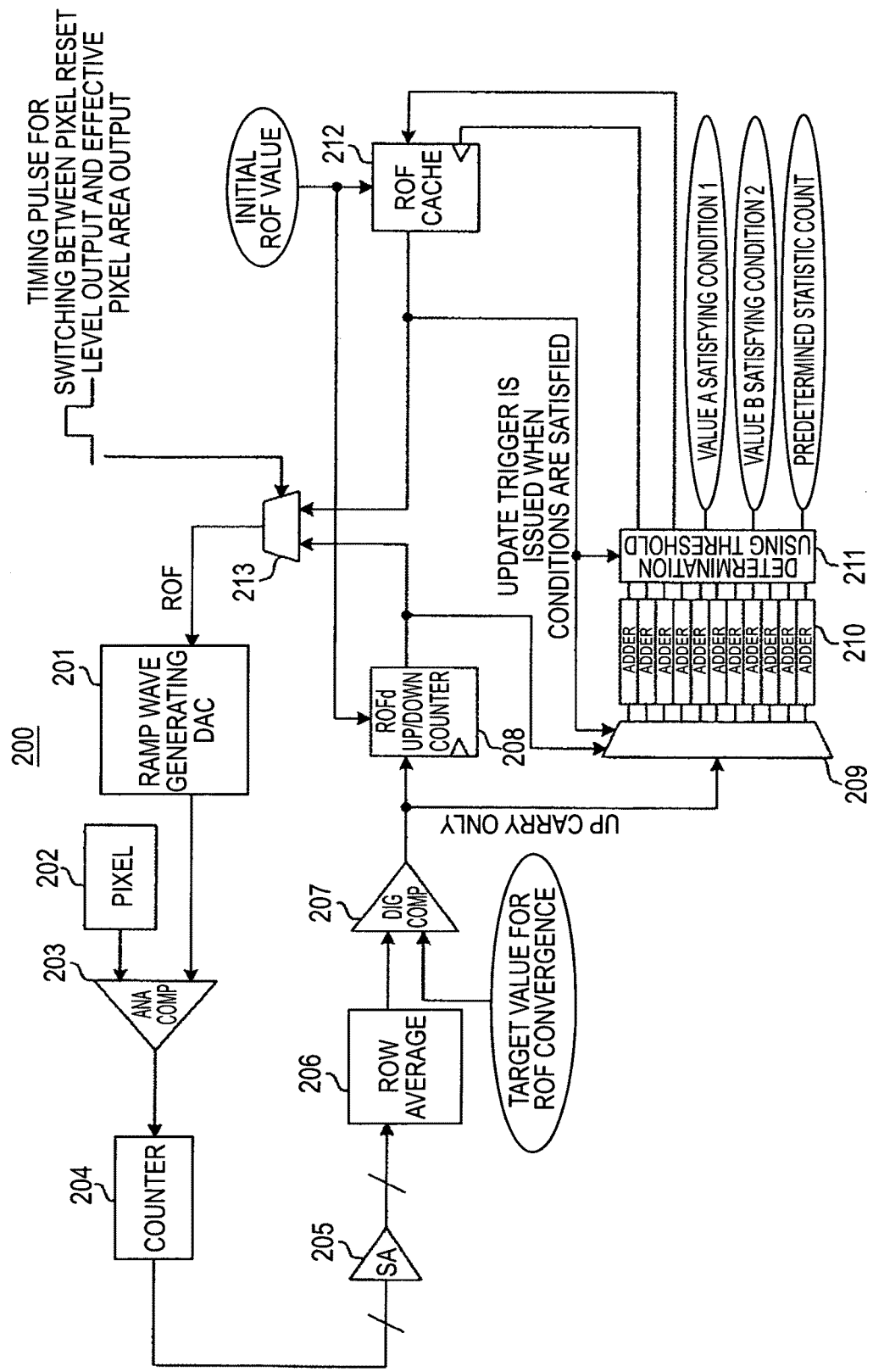

SOLID-STATE IMAGING DEVICE AND CAMERA SYSTEM WITH A RESET-LEVEL VARIATION CORRECTION FUNCTION

BACKGROUND OF THE INVENTION

1. Field of the Invention

The present invention relates to a solid-state imaging device which may typically be a CMOS image sensor and to a camera system having such a device.

2. Description of the Related Art

Recently, increasing attention is paid to CMOS image sensors which are regarded as solid-state imaging devices (image sensors) to replace CCDs.

The manufacture of CCD pixels necessitates dedicated processes, and a plurality of power supply voltages are required to operate the pixels. Further, the pixels must be driven by a plurality of peripheral ICs operating in combination.

Under the circumstance, CMOS image sensors are regarded advantageous because problems including high complicatedness of such a driving system are overcome in CMOS image sensors.

A CMOS image sensor can be manufactured using manufacturing processes similar to those used for common CMOS integrated circuits. A CMOS image sensor can be driven by a single power source, and it can be consolidated with analog circuits and logic circuits manufactured using CMOS processes into a single chip.

As thus described, a CMOS image sensor provides a plurality of significant advantages such as a reduction in the number of peripheral ICs required.

The main stream of CCD output circuits is one-channel type circuits utilizing an FD amplifier including a floating diffusion layer.

On the contrary, CMOS image sensors include an FD amplifier provided at each pixel, and the main stream of such sensors is column-parallel output type sensors. That is, pixels of one selected row of pixels in a pixel array of such a sensor are simultaneously read out in the direction in which pixel columns are arranged (column direction).

It is difficult to provide sufficient driving capability with an FD amplifier provided at each pixel, and the data rate must therefore be reduced in this case. Parallel processing is regarded advantageous for such a reason.

Various circuits have been proposed as pixel signal readout (output) circuits for column-parallel output type CMOS image sensors. One of the most advanced mode of such circuits is a type of circuits in which an analog-digital converter (hereinafter abbreviated as "ADC") is provided at each column of pixels to obtain a pixel signal as a digital signal.

For example, CMOS image sensors incorporating such column-parallel type ADCs are disclosed in W. Yang et al., "An Integrated 800×600 CMOS Image System" ISSCC Digest of Technical Papers, pp. 304-305, February, 1999 (Non-Patent Document 1) and JP-A-2005-278135 and JP-A-2005-323331 (Patent Documents 1 and 2).

FIG. 1 is a block diagram of a solid-state imaging device (CMOS image sensor) having column-parallel type ADCs showing an exemplary configuration thereof.

As shown in FIG. 2, a solid-state imaging device 10 includes a pixel section 11 serving as an imaging section, a vertical scan circuit 12, a horizontal transfer scan circuit 13, a timing control circuit 14, an ADC group 15, a digital-analog converter (hereinafter abbreviated as "DAC") 16, a sense circuit 17, and a signal processing circuit 18.

The pixel section 11 is formed by unit pixels PXL disposed in the form of a matrix, each unit pixel including a photodiode and an in-pixel amplifier.

The solid-state imaging device 10 also includes control circuits for sequentially reading out signals from the pixel section 11. The control circuits include the timing control circuit 14 which generals an internal clock, the vertical scan circuit 12 which controls row addressing and row scanning, and the horizontal transfer scan circuit 13 which controls column addressing and column scanning.

The ADC group 15 include comparators 15-1 each of which compares a reference voltage Vslop that is a ramp waveform (RAMP) obtained by varying stepwise a reference voltage generated by the DAC 16 with an analog signal obtained from a pixel on each row of pixels via a vertical signal line.

The ADC group 15 is formed by a plurality of columns of ADCs each including a comparator 15-1, a counter 15-2 counting the time of comparison performed by the comparator 15-1, and a latch (memory device) 15-3 holding the result of the counting.

The ADC group 15 has the function of converting a signal into an n-bit digital signal, and one ADC is disposed in association with each vertical signal line (column line) to form a column-parallel ADC block.

The output of each latch 15-3 is connected to a n-bit wide horizontal transfer line 19.

In association with the horizontal transfer line 19, n sense circuits 17 and a signal processing circuit 18 are provided.

FIG. 2 is a circuit diagram of such a comparator showing an exemplary configuration thereof.

A comparator 15-1 is configured as a common differential amplifier formed by PMOS transistors PT1 and PT2 and NMOS transistors NT1 and NT2.

Capacity elements C1 and C2 are connected in series to gate terminals of the transistors NT1 and NT2 serving as an input portion of the comparator, and an input signal is input to the comparator with DC components removed from the signal.

Reset switches SW1 and SW2 are also provided for setting an initial operating voltage.

Operations of the CMOS image sensor 10 shown in FIG. 1 will now be described with reference to the timing chart shown in FIG. 3.

After the readout of a reset level from the unit pixels PXL on an arbitrary row Vx to column lines H0, H1, . . . is stabilized (time t8), the comparators 15-1 are reset by a reset signal PSET for the comparators 15-1.

Such an operation allows any variation of the reset level at each pixel and any offset voltage of the relevant comparator to be memorized or absorbed by the capacity elements C1 and C2.

Next (time t10), a sloped waveform resulting from a time-dependent change in the reference voltage RAMP (Vslop) is input from the DAC 16, and the waveform is compared with a voltage from an arbitrary column line Hx at the relevant comparator 15-1.

When the sloped waveform is input, first counting is carried out by the counter 15-2 simultaneously and in parallel with the input of the sloped waveform. The counter 15-2 carries out the counting in a decremental mode.

When the reference voltage RAMP and the voltage from the arbitrary column line Hx equals each other, the output of the comparator 15-1 is inverted, and a count corresponding to the period of counting is held in the counter 15-2.

Since the first conversion is the conversion of a reset level of the pixels, values that the signal can assume is limited in a rather small range, the conversion requires a conversion time shorter than that required for second conversion.

Second readout is carried out to read out a signal component according to the amount of light incident on the unit pixel PXL, and the signal component is converted through an operation that is similar to the first readout. At this time, the counter 15-2 carries out incremental counting.

When the reference voltage RAMP and the voltage from the column line Hx equal each other, the output of the comparator 15-1 is inverted again (time t22). At this time, the counter holds a difference between the result of the second conversion and the result of the first conversion, i.e., the conversion of the reset level.

This example of the related art is significantly characterized in that CDS is carried out as thus described.

After the A-D conversion period terminates as thus described, the data in the counters are saved in the memories 15-3, and the A-D converters start A-D conversion of the next row $V_{x+1}$.

In the mean time, the data in a memory 256 are sequentially selected by the horizontal transfer scan circuit 13 and read out using the sense circuit 17.

According to the A-D conversion method which is typically illustrated in FIG. 1, the resolution of A-D conversion (the magnitude of 1 LSB) is determined by the counting speed of the counter 15-2 during a change in the reference voltage RAMP and the slope of the reference voltage RAMP.

The conversion method will be described in detail with reference to FIG. 4.

FIG. 4 is an enlarged view of the reset component converting part of FIG. 3.

Let us assume that the time required for a counter to increment or decrement its count will be referred to as "count cycle". Then, the amount of a change in the reference voltage RAMP during a count cycle is the resolution of an A-D converter (the magnitude of 1 LSB).

When the reference voltage has a steep slope as represented by the solid line, the width of 1 LSB is great. When the reference voltage has a gentle slope as represented by the broken line, the width of 1 LSB is smaller.

Controlling the width of 1 LSB by changing the slope of the voltage is equivalent to controlling the readout gain.

SUMMARY OF THE INVENTION

Problems of the above-described method will now be described.

According to the method, comparators 15-1 are reset by a signal PSET prior to A-D conversion to eliminate variation of the reset level of pixels and offset voltages at the comparators 15-1. However, it is not necessarily possible to eliminate all types of variation at this stage.

The following variation components may not be completely eliminated by the reset operation and can therefore be reflected in results of the first conversion of pixel reset levels.

<1> KTC noise generated when the PSET pulse is off

<2> Feed-through noise generated when the PSET pulse is off

<3> Variation of the inverting speed of the comparators 15-1 between columns of pixels <4> Noise in pixel outputs Those variation components are generated under the influence of wafer process variations and environmental factors such as the power supply voltage and temperature.

FIG. 5 is an illustration showing how results of pixel reset level conversion are output as an image output.

The image does not represent signals output from pixels which are dependent on light because the image reflects results of pixel reset level conversion only. Therefore, only variation components which cannot be completely eliminated by the above-described operation of resetting the comparators appear in the image as conversion results. Obviously, what is shown in FIG. 5 is an image which is not output in normal operation.

FIG. 6 is a histogram of pixel reset level conversion output values in one screen.

In FIG. 6, conversion results [LSB values] are shown along the horizontal axis, and the frequency at which each LSB value is output is shown along the vertical axis.

Since the count used for conversion of pixel reset outputs is smaller than the count used for conversion of pixel signal components as shown in FIG. 3, the range of the conversion results that can be plotted along the horizontal axis of FIG. 6 is small. Obviously, it is incorrect to say that A-D conversion is properly performed unless all conversion results reside in the small range.

The median of the histogram shown in FIG. 6 can be controlled by adjusting the value of the reference voltage RAMP when the comparators are reset using the signal PSET.

FIGS. 7 and 8 are graphs for explaining control exercised on the reference voltage value at the time of a pixel reset.

The signal PSET shown in FIG. 7 corresponds to the reset signal show in FIG. 3.

The median of a histogram can be controlled as show in FIG. 8 by adjusting the electric potential of the reference voltage RAMP.

The electric potential of the reference signal RAMP is adjusted stepwise in association with various ROF value settings which are represented by ROF=0, ROF=1, ..., ROF=n in FIG. 8 for the sake of convenience.

FIG. 3 is plotted on the assumption that ROF is 0. When the pixel reset signal is A-D converted in this state, the slope of the reference voltage RAMP starts from the level at which any offset is removed.

As a result, the comparators are inverted immediately, and about one half of the relevant histogram is fixed at the AD conversion output value of 0 LSB. It is therefore expected that A-D conversion will not be properly carried out.

In order to prevent the above-described situation, the ROF value is adjusted such that all histograms will properly stay in the range represented by the horizontal axis of FIG. 8.

It is the simplest and most popular way to adjust an ROF value by setting a register or the like appropriately. However, as described above, variation components (especially the median thereof) which appear in results of pixel reset level conversion have dependence on wafer processing and dependence on power supply voltage and temperature, as described above.

For this reason, as shown in FIG. 9, while A-D conversion can be carried out without problem under certain conditions, an edge of a histogram of pixel reset levels can exceed an A-D conversion output range defined along the horizontal axis of the histogram as a result of a change in the median under certain conditions, and proper A-D conversion can consequently be disabled.

Even when it is attempted to solve the above-described problem by setting an ROF value using a register, the influence of wafer processing still remains.

The solution is not practical because it necessitates adjustment of individual chips and consequently results in a very high inspection cost. Further, since changes in power supply voltage and temperature cannot be followed up by adjusting register setting, this approach cannot the problem alone.

Under the circumstance, an ROF value must be set with a sufficient margin to absorb such variable factors. However, a histogram itself has a great width when a setting for a high gain is adopted.

As a result, it becomes difficult to set an ROF value in an adequate position with respect to an A-D conversion result output range defied along the horizontal axis of a histogram as shown in FIG. 10.

On the contrary, there is strong demand from customers for a high A-D conversion gain. Therefore, stable A-D conversion of pixel reset levels constitutes a significant problem to be solved in this type of CMOS image sensors.

It is therefore desirable to provide a solid-state imaging device in which optimal A-D conversion results of pixel reset levels can be always obtained without being affected by wafer processing and environmental factors such as power supply voltage and temperature and to provide a camera system having such a device.

According to an embodiment of the invention, there is provided a solid-state imaging device including a pixel section formed by a matrix-like array of a plurality of pixels performing photoelectric conversion and a pixel signal readout section reading out pixel signals from the pixel section in units for readout, i.e., pluralities of pixels. The pixel signal readout section includes a column-parallel type ADC group formed by a plurality of analog-digital converters (ADCs) for performing A-D conversion of a pixel reset level and a signal processing system. The signal processing system obtains only an average value of results of A-D conversion of pixel reset levels for a plurality of pixels and automatically adjusts an input offset value for the conversion range of the ADCs such that the average value of pixel reset levels will be adequately positioned with respect to the A-D conversion range.

According to another embodiment of the invention, there is provided a camera system including a solid-state imaging device and an optical system forming an image of an object on the imaging device. The solid-state imaging device includes a pixel section formed by a matrix-like array of a plurality of pixels performing photoelectric conversion and a pixel signal readout section reading out a pixel signal from the pixel section in units for reading each formed by a plurality of pixels. The pixel signal readout section includes a column-parallel type ADC group formed by a plurality of analog-digital converters (ADCs) for performing A-D conversion of a pixel reset level and a signal processing system. The signal processing system obtains only an average value of results of A-D conversion of pixel reset levels for a plurality of pixels and automatically adjusts an input offset value for the conversion range of the ADCs such that the average value of pixel reset levels will be adequately positioned with respect to the A-D conversion range.

According to the embodiments of the invention, optimal A-D conversion results can be always obtained without being affected by wafer processing and environmental factors such as power supply voltage and temperature.

BRIEF DESCRIPTION OF THE DRAWINGS

FIG. 19 is a graph showing operations performed during ROF convergence according to the embodiment of the invention;

FIG. 20 is a table representing a statistical process according to the embodiment of the invention;

FIG. 21 is a diagram showing an example of a circuit for implementing the algorithm according to the embodiment of the invention;

DESCRIPTION OF PREFERRED EMBODIMENTS

Embodiments of the invention will now be described with reference to the drawings. The following items will be described in the order listed.

1. General Configuration of CMOS image Sensor
2. Outline of Method for Adjusting Input Offset Value of ADC Conversion Range
3. Basic Algorithm for Adjusting Input Offset Value of ADC Conversion Range
4. Algorithm of High-Speed Convergence Mode
5. Algorithm of Low-Speed Convergence Mode
6. Method of Outputting Pixel Reset Level Conversion Result from ADC
7. Conditions for ROF Update
8. Statistical Process
9. Exemplary Circuit of Signal Processing System
10. Another Exemplary Circuit of Signal Processing System
11. Exemplary Configuration of Camera System <1. General Configuration of CMOS Image Sensor>

Figure 11:
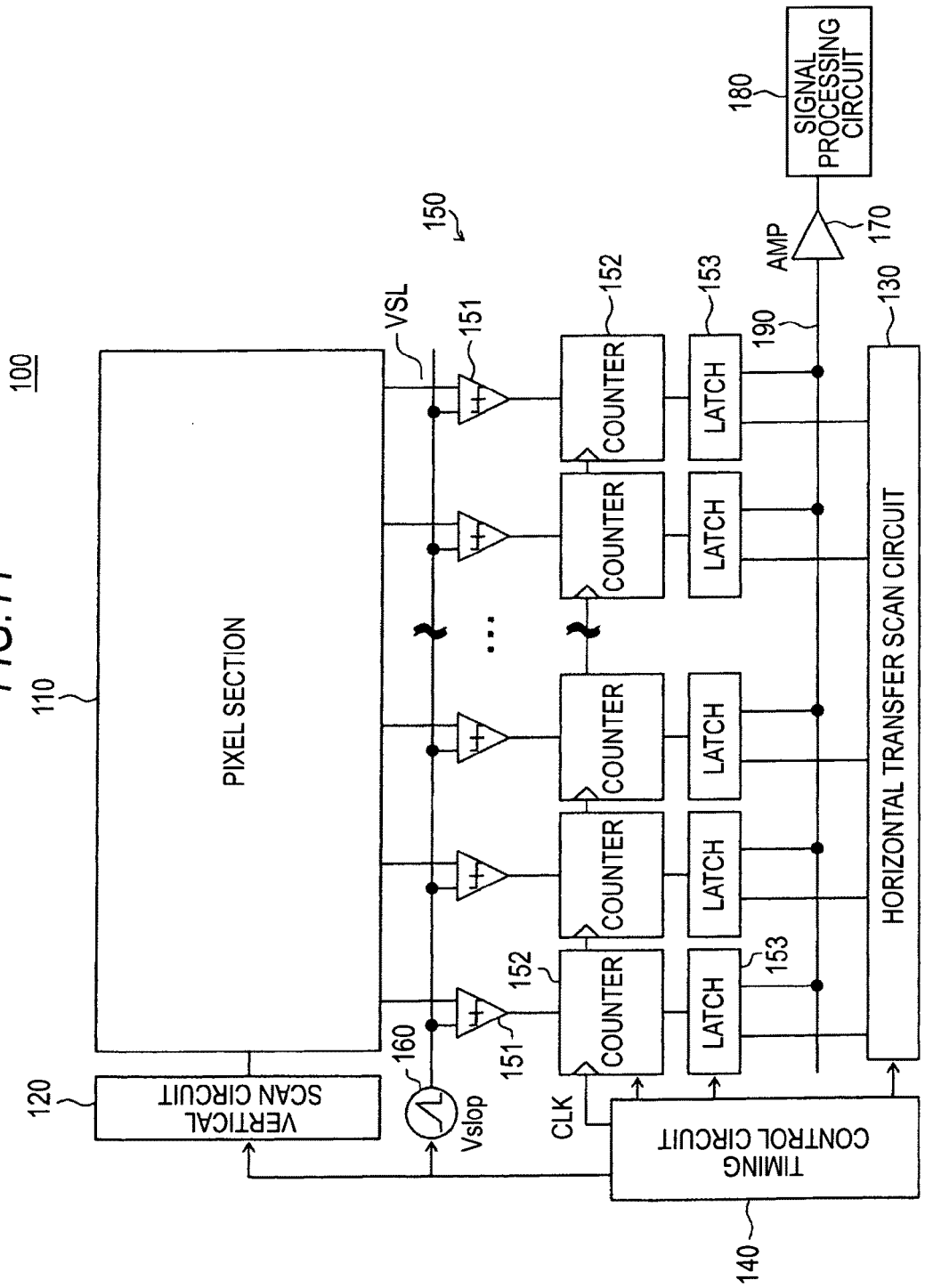
FIG. 11 is a block diagram of an exemplary configuration of a solid-state imaging device (CMOS image sensor) having column-parallel type ADCs according to an embodiment of the invention.

FIG. 11 is a block diagram of a solid-state imaging device (CMOS image sensor) 100 incorporating column-parallel ADCs according to an embodiment of the invention showing an exemplary configuration of the device.

As shown in FIG. 11, the solid-state imaging device 100 includes a pixel section 110 serving as an imaging section, a vertical scan circuit 120, a horizontal transfer scan circuit 130, and a timing control circuit 140.

The solid-state imaging device 100 also includes an ADC group 150 forming part of a pixel signal readout section, a digital-analog converter (DAC) 160, a sense circuit (S/A) 170, a signal processing circuit 180, and horizontal transfer line 190.

The pixel signal readout section is formed by the ADC group 150, the DAC 160, the sense circuit (S/A) 170, the signal processing circuit 180, and the horizontal transfer line 190.

The pixel section 110 is a matrix-like array of pixels each including a photodiode and an in-pixel amplifier.

Figure 12:
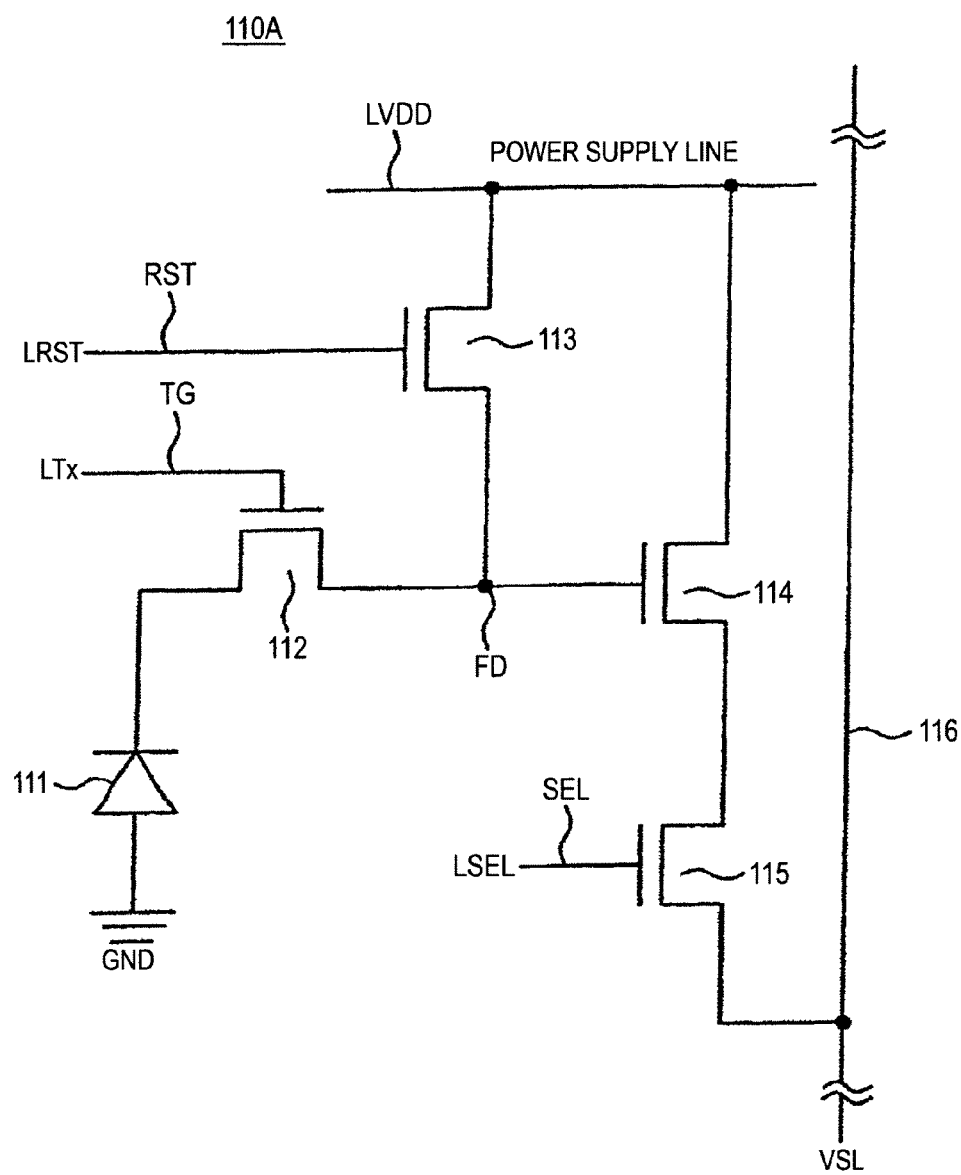
FIG. 12 is a diagram showing an example of a pixel of the CMOS image sensor according to the embodiment, the pixel being formed by four transistors.

FIG. 12 is a diagram showing an example of a pixel of the CMOS image sensor according to the present embodiment which is formed by four transistors.

For example, a pixel circuit 110A includes a photodiode 111 serving as a photoelectric conversion device.

The pixel circuit 110A includes four transistors as active devices associated with one photodiode 111, i.e., a transfer transistor 112 as a transfer element, a reset transistor 113 as a reset element, an amplification transistor 114, and a selection transistor 115.

The photodiode 111 photo-electrically converts incident light into electrical charge (electrons in this case) in an amount according to the quantity of the incident light.

The transfer transistor 112 is connected between the photodiode 111 and a floating diffusion FD serving as an output node.

A drive signal TG is supplied through a transfer control line LTx to the gate (transfer gate) of the transfer transistor 112. Thus, the electrons obtained by the photoelectric conversion at the photodiode 111 are transferred to the floating diffusion FD.

The reset transistor 113 is connected between a power supply line LVDD and the floating diffusion FD.

A reset signal RST is supplied through a reset control line LRST to the gate of the reset transistor 113 to reset the electric potential at the floating diffusion FD to the electric potential on the power supply line LRST.

The gate of the amplification transistor 114 is connected to the floating diffusion FD. The amplification transistor 114 is connected to a vertical signal line 116 through the selection transistor 115, and the transistor forms a source follower in combination with a constant current source provided outside the pixel section.

A selection control signal LSEL (an address signal or a select signal) is supplied to the gate of the selection transistor 115 through a selection control line LSEL to turn the selection transistor 115 on.

When the selection transistor 115 is turned on, the amplification transistor 114 amplifies the electric potential at the floating diffusion FD and outputs a voltage according to the electric potential to the vertical signal line 116. A voltage output from each pixel through the vertical signal line 116 as thus described is output to the column (column-parallel type) ADC group 150 serving as a pixel signal readout section.

Those operations are performed at the pixels of each row simultaneously because the gates of the transfer transistors 112, the reset transistors 113, and the selection transistors 115 are connected to group the pixels on a row-by-row basis.

The reset control lines LRST, the transfer control lines LTx, and the selection control lines LSEL provided in the pixel section 110 are laid such that one set of those control lines serves each row of the pixel array.

The reset control lines LRST, the transfer control lines LTx, and the selection control lines LSEL are driven by the vertical scan circuit 120 serving as a pixel driving section.

The solid-state imaging device 100 includes the timing control circuit 140 generating an internal clock as a control circuit for reading out signals from the pixel section 110 sequentially, the vertical scan circuit 120 controlling row addressing and row scanning, and the horizontal transfer scan circuit 130 controlling column addressing and column scanning.

The ADC group 150 includes comparators 150 each of which compares a reference voltage RAMP (Vslop) that is a ramp waveform (RAMP) obtained by varying stepwise a reference signal generated by the DAC 160 with an analog signal voltage VSL obtained from a pixel on each row of pixels through the vertical signal line.

The ADC group 150 is an array of a plurality of ADCs each including a comparator 151 as thus described, a counter 152 counting the time of comparison carried out by the comparator 151, and a latch (memory) 153 holding the result of the counting.

The ADC group 150 has the function of converting a signal into an n-bit wide digital signal, and one ADC is provided for each vertical signal line (column line) 116 to form a column-parallel ADC block.

For example, the output of each latch 153 is connected to an n-bit wide horizontal transfer line 190. In association with the horizontal transfer line 190, n sense circuits 170 and a signal processing circuit 180 are provided.

Basic operations of the ADC group are as follows.

At the ADC group 150, the comparator 151 disposed in each column compares an analog signal (electric potential VSL) read out on to the vertical signal 116 with a reference voltage RAMP (Vslop) that is a sloped waveform changing linearly with a certain slope.

At this time, the counter 152 disposed in each column like the comparator 151 is in operation. The value of the reference voltage Vslop having a ramp waveform and the counter value change in one-to-one correspondence with each other, whereby the potential (analog signal) VSL on the vertical signal line 116 is converted into a digital signal.

Thus, a change in the voltage of the reference voltage RAMP is converted into a temporal change (time interval), and the time interval is counted using a certain period (clock) to convert it into a digital value.

When the electric potential VSL of the analog electrical signal and the reference voltage Vslop cross each other, the output of the counter 152 is inverted to stop the clock input to the counter 152 or to resume the input of the clock to the counter 152, whereby A-D conversion is completed.

After A-D conversion is completed as this described, data held in the latches 153 are transferred to the horizontal transfer line 190 by the horizontal transfer scan circuit 130. The data are input to the signal processing circuit 180 through the sense circuits 170, and predetermined signal processing is performed at the circuit 180 to generate a two-dimensional image.

The column-parallel type ADC group 150 according to the present embodiment performs automatic control to set an offset level input to an ADC at an appropriate value with respect to a pixel reset level.

Thus, a pixel reset level can be always optimally converted without being affected by varying characteristics of samples, temperature changes, and voltage changes.

A signal processing system that is characteristic of the column-parallel type ADC group 150 will now be described in detail.

<2. Outline of Method of Adjusting Input Offset Value of ADC conversion Range>

In the present embodiment, the column-parallel type ADC group 150 is used in a signal processing system of the solid-state imaging device 100 to obtain only an average value of A-D converted pixel reset levels of a plurality of pixels.

The signal processing system automatically adjusts input offset values of an ADC conversion range such that an average value of pixel reset levels will be adequately positioned with respect to the A-D conversion range.

An image output from the solid-state imaging device 100 includes a dedicated area in which results of A-D conversion of pixel reset levels are output. The signal processing system exercises control such that different offset values will be used for the ADC conversion range between the dedicated area and the other area.

The automatic adjustment performed in the present embodiment is characterized in that a value is controlled upward or downward toward a target value and that there is no dead zone.

In the signal processing system of the solid-state imaging device 100, a history of upward and downward control is recorded for an arbitrary period, and an optimal input offset value of the ADC conversion range can be calculated from the history using a predetermined calculation formula.

The solid-state imaging device 100 of the present embodiment has two or more modes in which automatic adjustment takes different times to converge.

The signal control system controls the differences in converging time by changing the size of the dedicated area.

More specifically, in the solid-state imaging device 100 of the embodiment, the physical positions of pixels read out in a dedicated area as described above of an output image for outputting A-D converted pixel reset levels vary from one frame to another.

In the output signal processing system of the solid-state imaging device according to the present embodiment, an analog CDS circuit and column-parallel type ADCs are used.

In the signal processing system, input offset values of the ADC conversion range are automatically adjusted such that black levels as pixel output signal values are positioned adequately with respect to the A-D conversion range.

In the present embodiment, an output image includes a dedicated area for detecting an average value of black levels, and control is exercised such that different offset values will be used for the ADC conversion range between the dedicated area and the other area.

The description will now focus on a method for setting such an ROF value that A-D conversion of pixel reset levels will always provide the most adequate results without being affected by the wafer processing employed and environmental factors such as the power supply voltage and temperature.

<3. Basic Algorithm>

Figure 13:
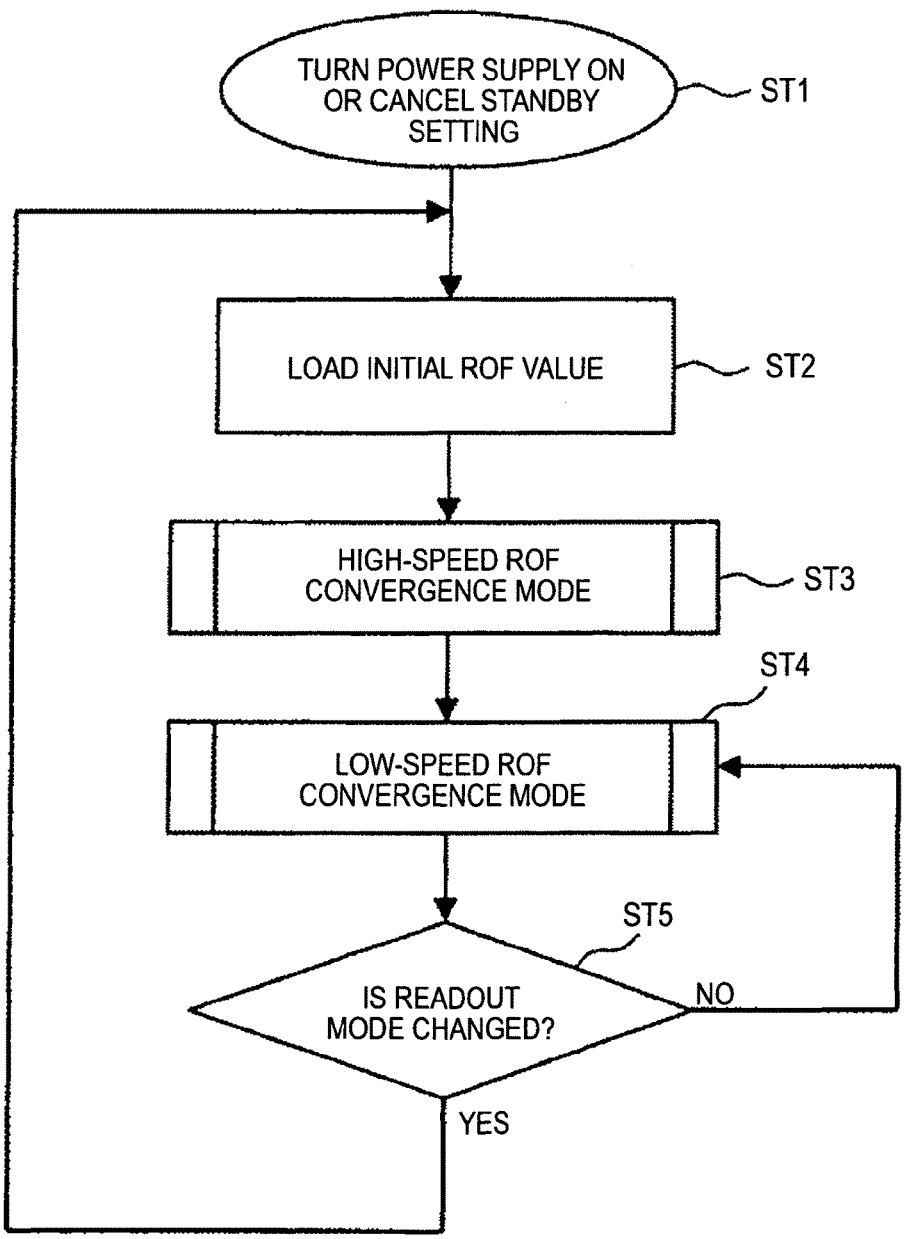
FIG. 13 is a flowchart showing basic algorithm according to the embodiment of the invention.

FIG. 13 is a flow chart showing basic algorithm according to the present embodiment of the invention.

After the power supply is turned on and a standby setting is canceled (ST1), an appropriate initial ROF value is loaded (ST2).

Next, the process enters a high-speed ROF convergence mode for automatically detecting and setting an optimal ROF value at a high speed (ST3).

Results of A-D conversion of pixel reset levels are detected with the power supply turned on and the standby setting canceled, and an optimal ROF value is set according to the finishing of the wafer process.

After an ROF value is decided in the high speed convergence mode, the process enters a los speed convergence mode (ST4).

Results of A-D conversion of pixel reset levels are continuously monitored while images are output in a normal manner. The ROF value is kept updated pursuant to changes in the optimal ROF value attributable to changes in environmental factors such as the power supply voltage and temperature.

The low-speed convergence mode continues unless a change is made in the readout mode or the like (ST5).

<4. Algorithm of High-Speed Convergence Mode>

Figure 14:
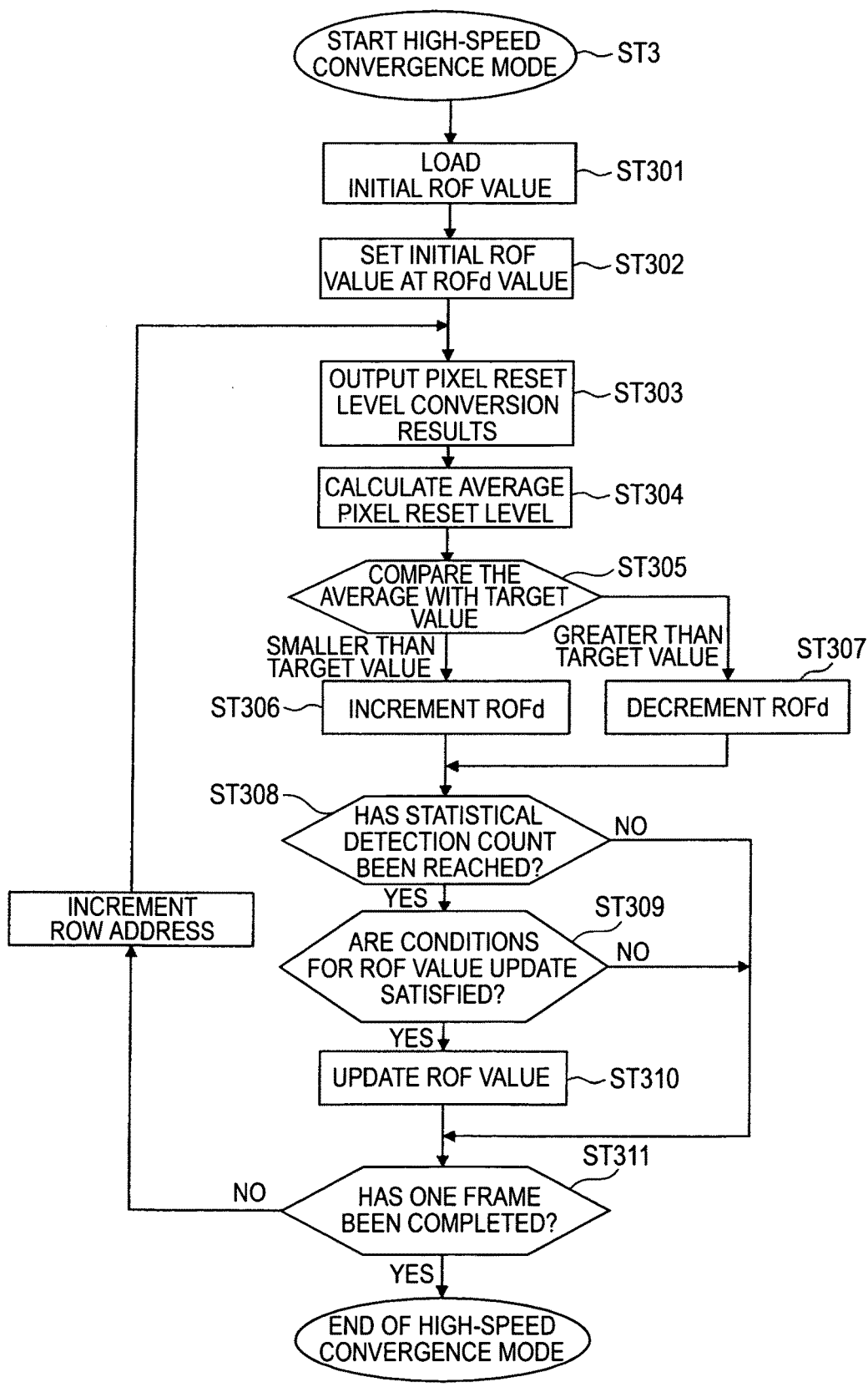
FIG. 14 is a flow chart showing algorithm for a high-speed ROF convergence mode defined as a subroutine in FIG. 13.

FIG. 14 is a flow chart showing algorithm of an ROF high-speed convergence mode defined as a subroutine in FIG. 13.

Figure 7:
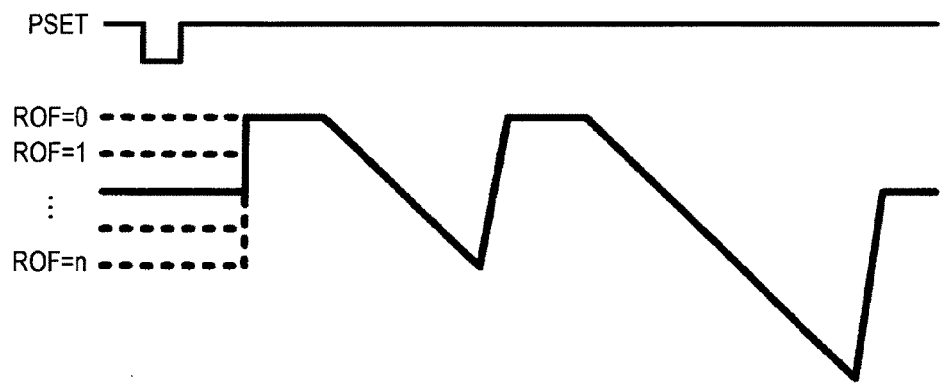
FIG. 7 is a first graph for explaining control exercised on a reference voltage value at the time of a pixel reset.
Figure 8:
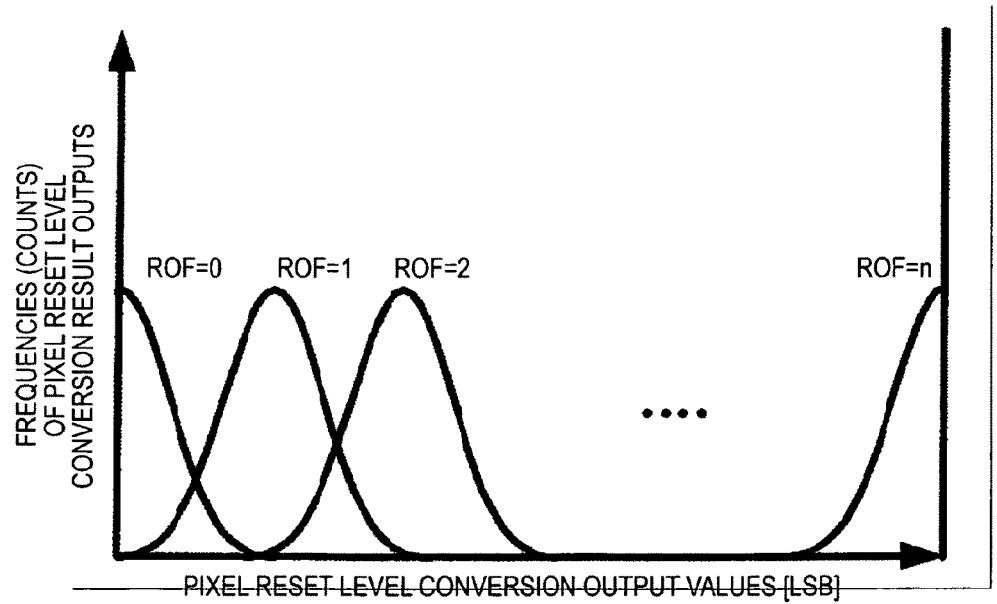
FIG. 8 is a second graph for explaining the control exercised on a reference voltage value at the time of a pixel reset.
Figure 9:
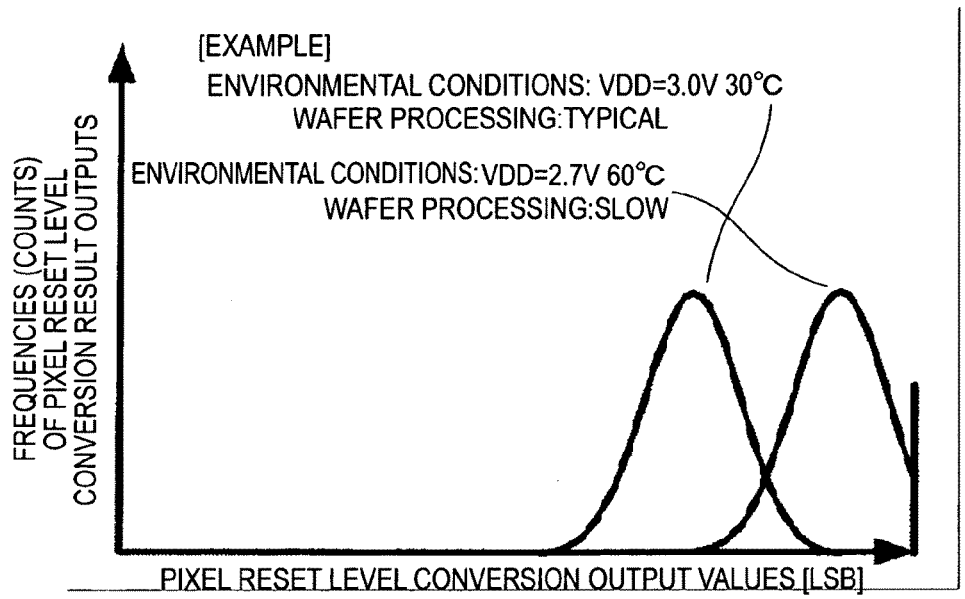
FIG. 9 is a graph showing that an edge of a histogram of pixel reset levels can exceed an A-D conversion output range represented by the horizontal axis of the histogram as a result of a change of the median under certain conditions and that proper A-D conversion of the pixel reset levels can consequently be disabled.
Figure 10:
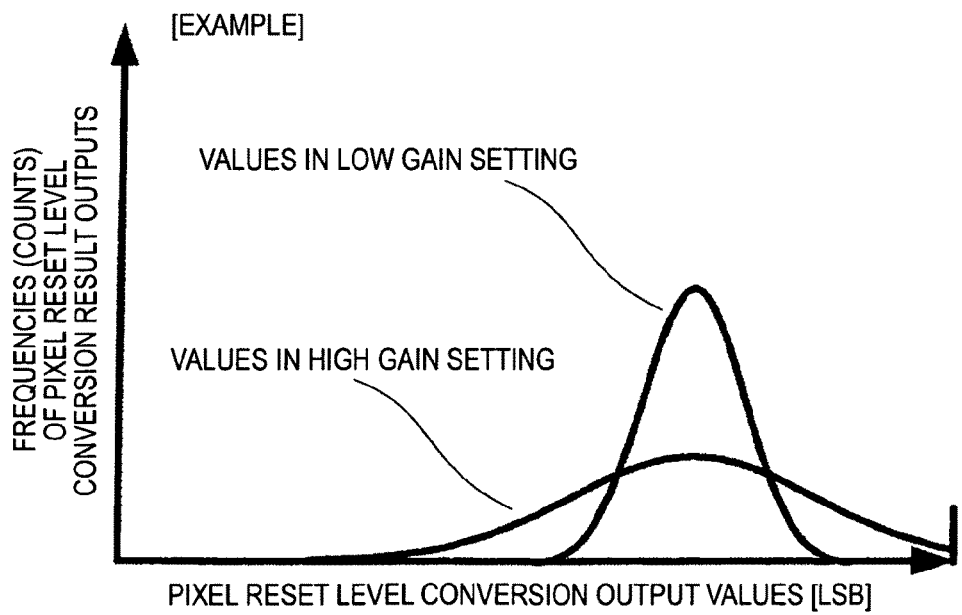
FIG. 10 is a graph showing that it is difficult in some occasion to set an ROF in an adequate position with respect to an output range for results of A-D conversion of pixel reset levels represented by the horizontal axis of the graph.

The term "ROF value" used in the algorithm corresponds to the ROF value illustrated in FIG. 7, and the term means an ROF value used for A-D conversion of signals read out from a normal effective pixel area.

The term "ROFd value" means an ROF value used for A-D conversion in the area where results of conversion of pixel reset levels are output.

It is one of the features of the present embodiment of the invention that separate values are set as an ROF value to be used for an effective pixel area and an ROF value to be used for a pixel reset level outputting area.

First, when the process enters the high-speed convergence mode, an initial ROF value is loaded (ST301). An appropriate value is set in advance as the initial value.

An initial ROFd value is similarly set in advance (ST302).

Next, the ADCs are set in a state for outputting results of conversion of pixel reset levels to output pixel reset levels of one row of pixels (ST303), and an average value of the output levels is calculated (ST304).

A method for outputting results of conversion of pixel reset levels from the ADCs will be described later.

The average value thus obtained is compared with a target value (ST305). When the average value is greater than the target value, the ROFd value is decremented (ST307). When the average value is smaller than the target value, the ROFd value is incremented (ST306).

One cycle of the statistical process is completed as thus described. Next, it is determined whether the statistical process has been repeated a predetermined number of times (ST308).

When the predetermined number of times has been reached, it is determined whether conditions for an ROF value update are satisfied or not from past statistical results (ST309). If the conditions are satisfied, the ROF value is updated (ST310).

When the predetermined number of times has not been reached or when the conditions for an ROF value update have not been satisfied while the frame of interest is not finished yet (ST311), the row address is incremented (ST312), and the above-described processes are repeated starting with the output of results of pixel reset level conversion.

The conditions for an ROF value update will be described later.

The above-described processes are repeated until one frame is finished.

Figure 15:
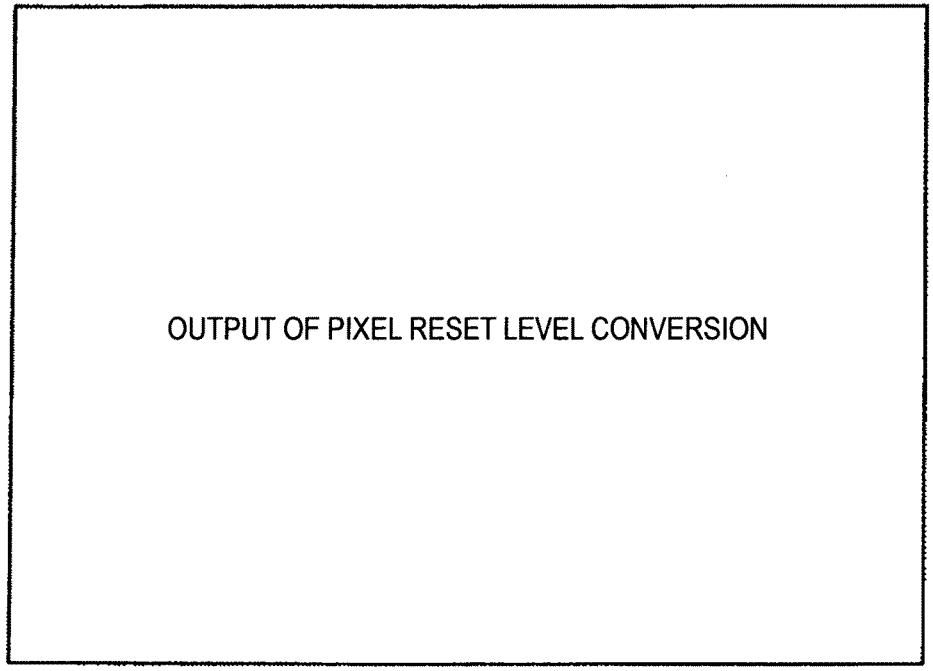
FIG. 15 is an illustration showing an image output obtained in the high-speed convergence mode in which results of pixel reset level conversion are always output.

Results of conversion of pixel reset levels are always output in the high-speed convergence mode, and an image is output as shown in FIG. 15 in this mode.

When convergence of an ROF value is achieved using one frame, the frame is treated as an invalid frame because not effective image data is output for the same, although ROF value convergence can be achieved at a high speed.

For this reason, the high-speed convergence mode is assumed to be used for only one frame when the power supply is turned on, when standby setting is cancelled, or when a mode change takes place.

<5. Algorithm of Low-Speed Convergence Mode>

Algorithm of the low-speed convergence mode defined as another subroutine will now be described with reference to FIG. 16.

Figure 16:
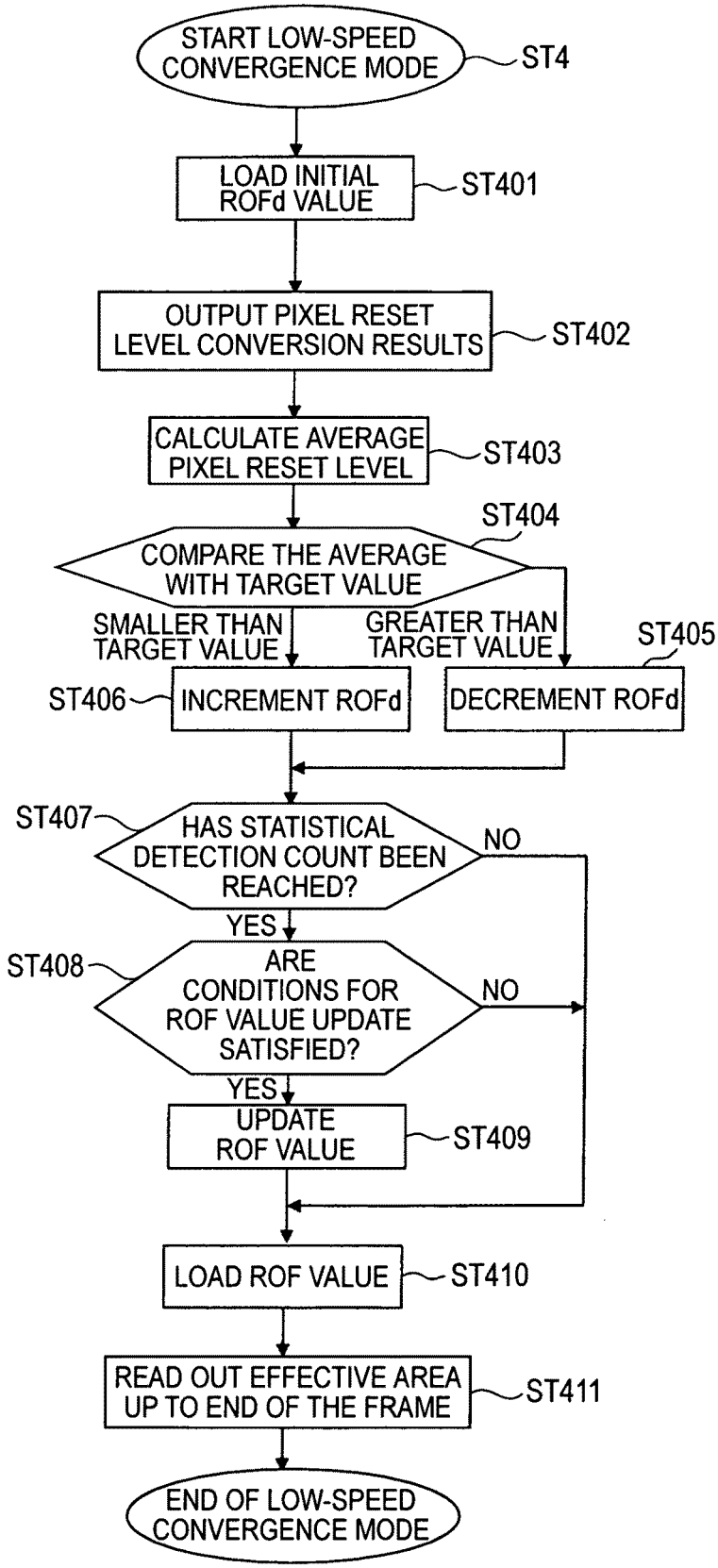
FIG. 16 is a flow chart of algorithm of a low-speed convergence mode defined as a subroutine in FIG. 13.

FIG. 16 is a flow chart showing the algorithm of the low-speed convergence mode which is defined as a subroutine in FIG. 13.

First, when the process enters the low-speed convergence mode, an ROFd value is loaded (ST401), and the ADCs are set to output results of conversion of pixel reset levels in that state, whereby results of conversion of pixel reset levels are read out (ST402).

In the same manner as in the high-speed convergence mode, an average value of the output levels is calculated (ST403), and the average value is compared with a target value (ST404). When the average value is greater than the target value, the ROFd value is decremented (ST405). When the average value is smaller than the target value, the ROFd value is incremented (ST406).

One cycle of the statistical process is completed as thus described.

Next, it is determined whether the statistical process has been repeated a predetermined number of times (ST407). When the predetermined number of times has been reached, it is determined whether the conditions for an ROF value update are satisfied or not from past statistical results (ST408). If the conditions are satisfied, the ROF value is updated (ST409).

When the predetermined number of times has not been reached or when the conditions for an ROF value update have not been satisfied, the previous ROF value is loaded (ST410), and readout of the effective area is started.

Since the same conditions for an ROF update apply to the high-speed convergence mode and the low-speed convergence mode, the conditions will be collectively described later.

Next, the ROF value is loaded (ST410), and the ADCs are set in a state for outputting results of a normal CDS process. The effective area is read out up to the end of the frame (ST411) to terminate the low-speed convergence mode.

Since the low-speed convergence mode is resumed unless a mode change takes place as shown in FIG. 13, the process itself is looped and continued.

In the low-speed convergence mode, results of conversion of pixel reset levels are output only for the first row of pixels, and data in the effective pixel area are output thereafter. Therefore, an image output as thus described is displayed as shown in FIG. 17.

Figure 17:
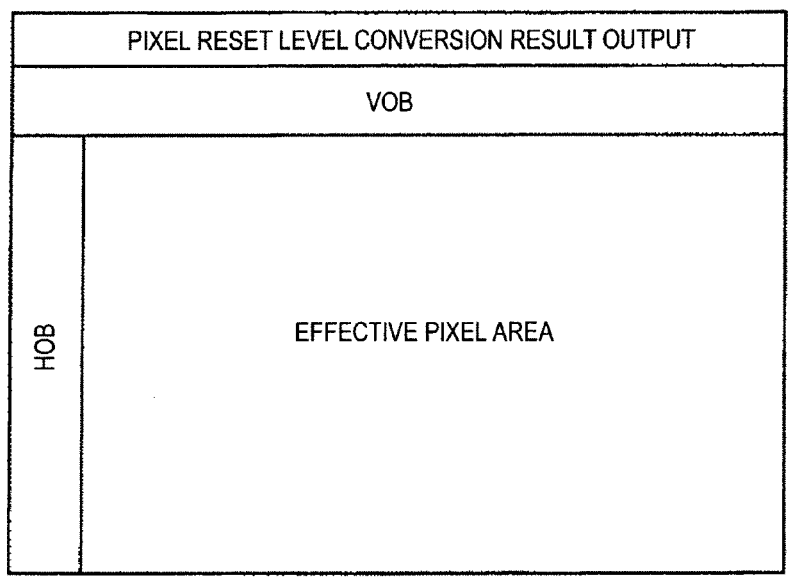
FIG. 17 is an illustration showing an image output obtained in the low-speed convergence mode in which results of pixel reset level conversion are output only in the first row of the screen and an effective pixel area is output after the first row.

The illustrated positions of a VOB region and an HOB region are merely examples, and the embodiment of the invention is not limited to the positions shown in FIG. 17.

<6. Method of Outputting Results of Pixel Reset Level Conversion from ADCs>

A description will now be made on a method of outputting results of pixel reset level conversion from the ADCs.

Figure 1:
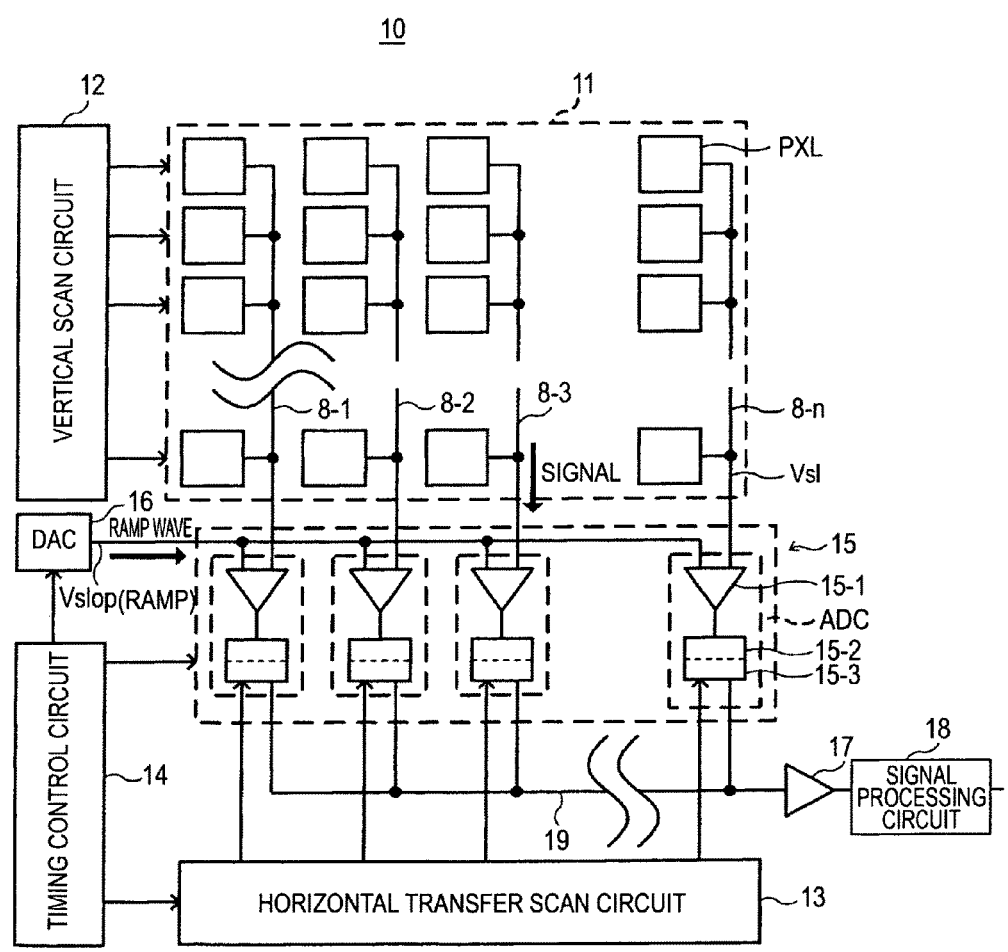
FIG. 1 is a block diagram showing an exemplary configuration of a solid-state imaging device (CMOS image sensor) having a column-parallel type ADCs.
Figure 2:
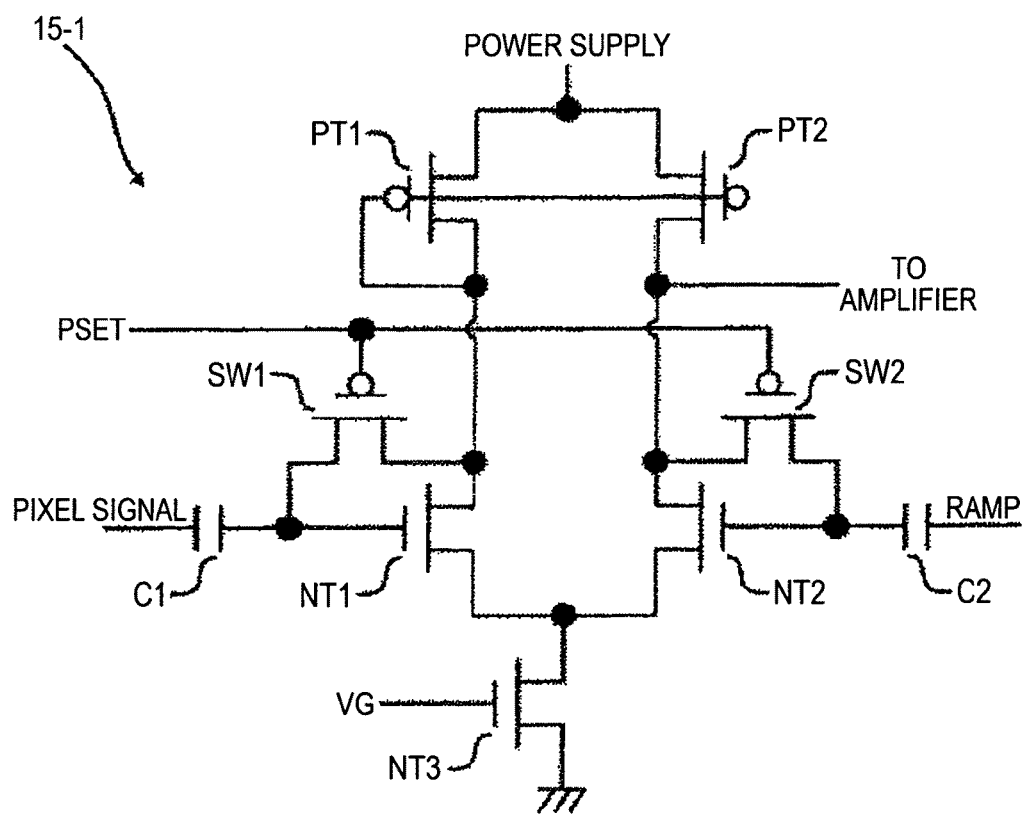
FIG. 2 is a circuit diagram showing an exemplary configuration of a comparator.
Figure 3:
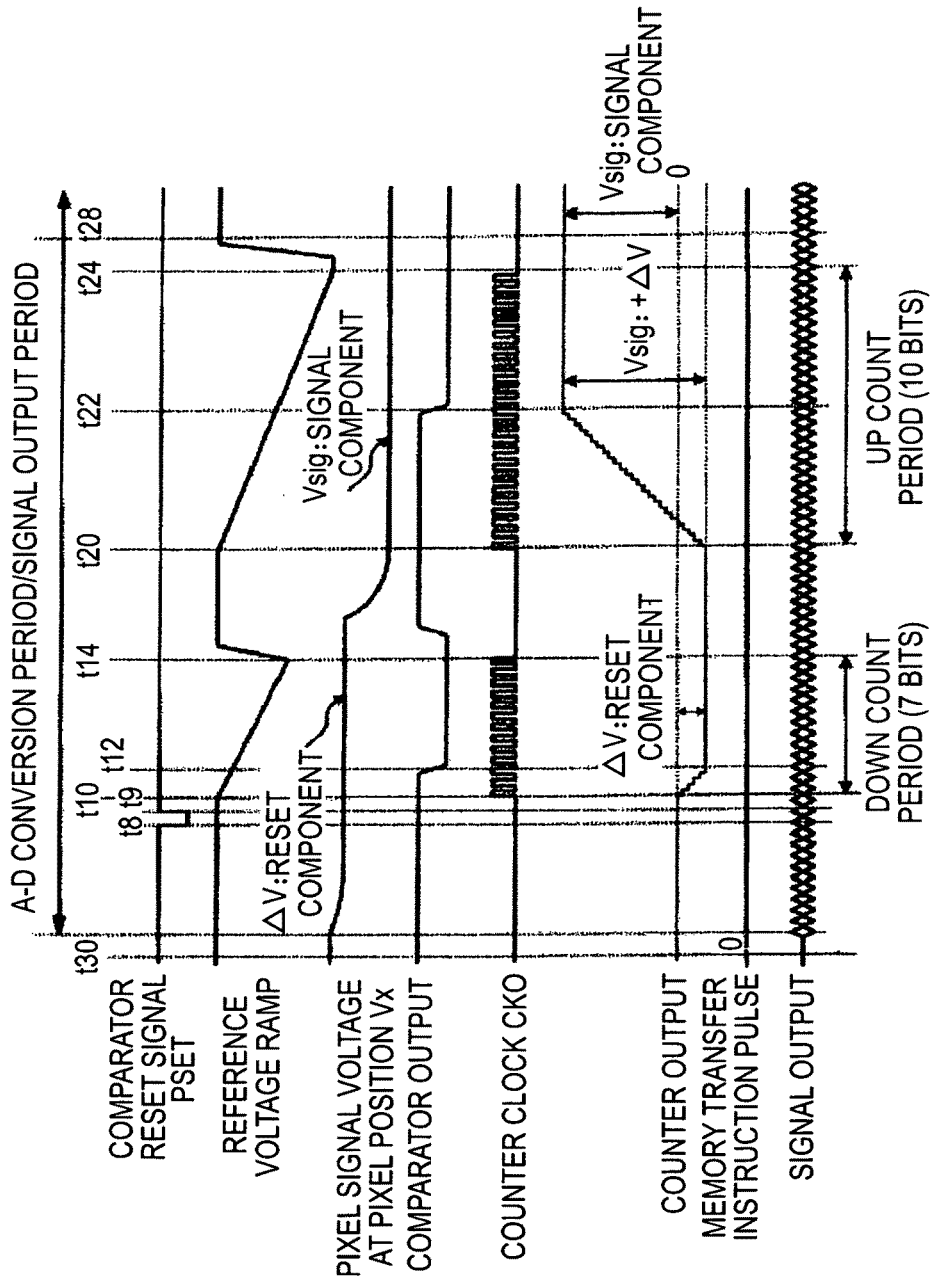
FIG. 3 is a timing chart for explaining operations of the CMOS image sensor in FIG. 1.
Figure 4:
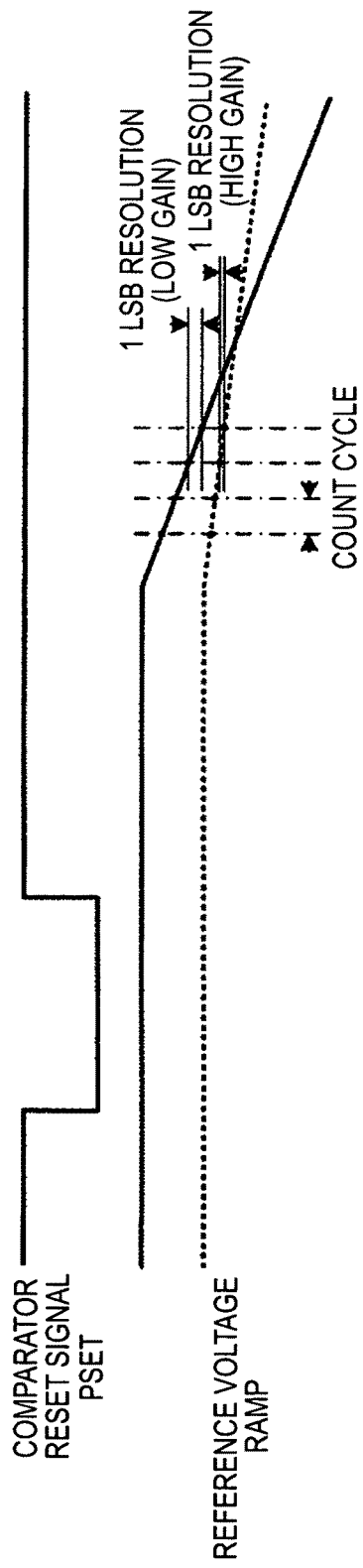
FIG. 4 is an enlarged partial view of FIG. 3 showing a reset component converting part.
Figure 5:
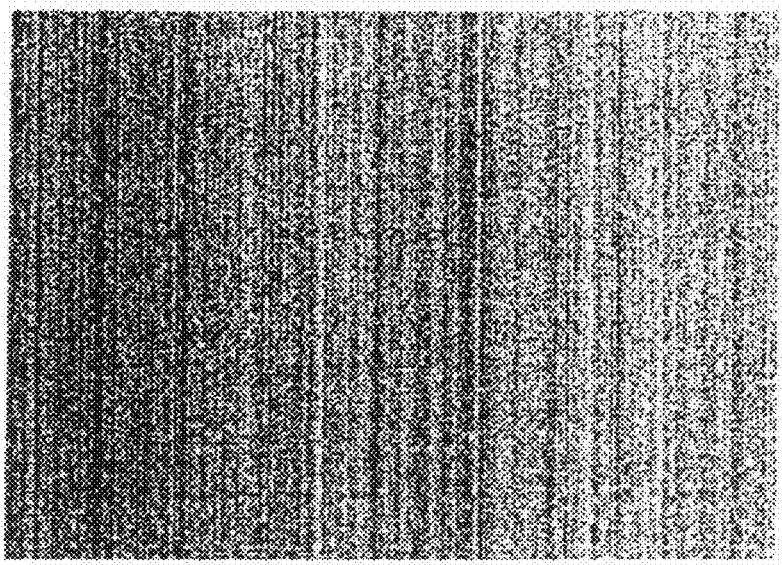
FIG. 5 is an illustration showing how results of pixel reset level conversion are output as an image output.
Figure 6:
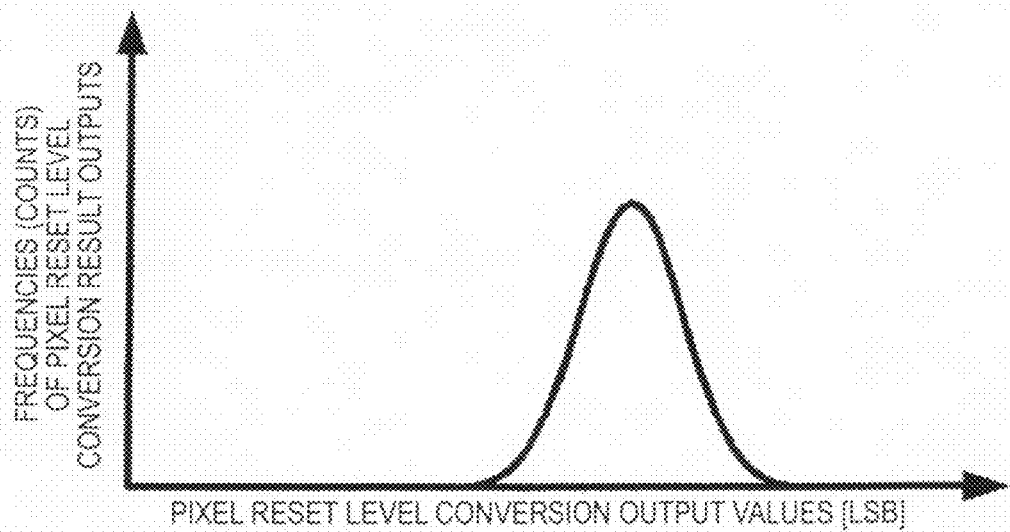
FIG. 6 is a histogram of pixel reset level conversion output values in one screen.

For example, when A-D conversion is performed according to the timing chart shown in FIG. 3, what is output is conversion results which have been subjected to a CDS process, and it is not possible to directly output only the results of pixel reset level conversion.

A description will now be made with reference to FIG. 18 on a method of directly outputting only results of pixel reset level conversion.

Figure 18:
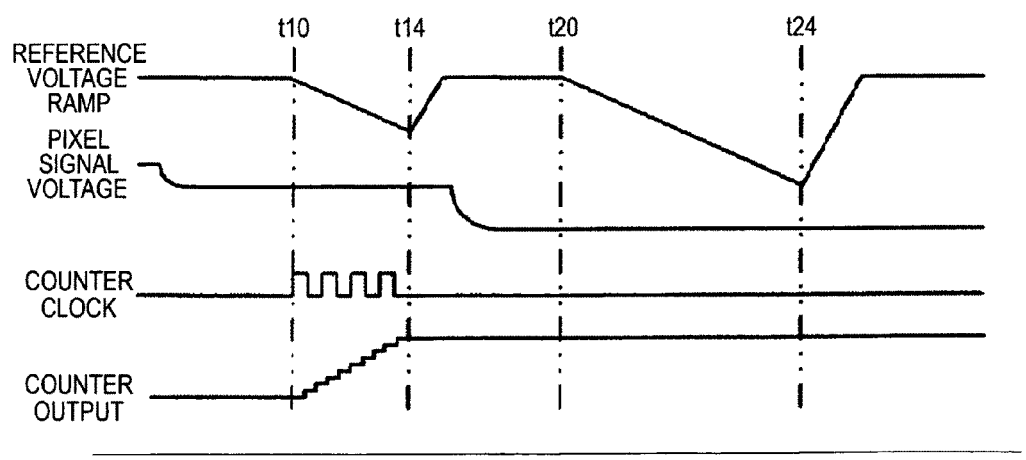
FIG. 18 is a graph for explaining a method of directly outputting only results of pixel reset level conversion according to the embodiment of the invention.

FIG. 18 is a graph for explaining the method of directly outputting only results of pixel reset level conversion according to the present embodiment.

FIG. 18 corresponds to FIG. 3 except that a counter clock is output only in a period during which pixel reset levels are converted and that the counter counts the time from zero in an incremental manner during the period.

When an ROFd value is loaded to output results of pixel reset level conversion, results of A-D conversion of pixel reset levels can be directly output by changing the counter clock and the mode of operation of the counter as thus described.

<7. Conditions for ROF Update>

The conditions for an ROF update will bow be described.

FIG. 19 is a graph representing operations of the present embodiment during ROF convergence.

In FIG. 19, the horizontal axis represents output values obtained by pixel reset level conversion, and the vertical axis represents frequencies at which results of pixel reset level conversion are output.

In this case, a target value for convergence is set, and the value ROFd is incremented when an average value of results of pixel reset level conversion is smaller than the target value.

When the average value is greater than the target value, the ROFd value is decremented.

Simple incremental/decremental control is exercised using only information on whether the average value is greater or smaller than the target value regardless of information on the difference between the average value and the target value. Therefore, the process finally results in an oscillating state in which the average value oscillates between magnitudes below and above the target value.

It is one of the characteristics of the embodiment of the invention that it employs simple incremental/decremental control and that the occurrence of an oscillating state is allowed to exist when pixel reset levels are detected.

Since an oscillating state is allowed, it is necessary to select an optimal ROFd value in such a state as an ROF value to be used in the effective pixel area.

For this purpose, a statistical process is carried out using a history of incremental/decremental control exercised in the past.

<8. Statistical Process>

FIG. 20 is a table representing a statistical process according to the embodiment of the invention.

For example, let us assume that the process starts at an ROFd value of 22 which is somewhat apart from a target value.

Since a value lower than the target value is output, the ROFd value is kept incremented for some time.

When the ROFd value equals 27, the target value is exceeded, and a first decrement takes place. Thereafter, the ROFd value is repeatedly incremented and decremented between 26 and 27.

A history of incremental and decremental signals is recorded by counting such signals until a predetermined statistical count is reached.

FIG. 20 shows an example in which the predetermined statistical count is 16. When the control has been exercised 16 times, the number of occurrences of an increment (indicated by "+" in FIG. 20) is statistically counted for each ROFd value.

Counts obtained as thus described are checked against conditions for an update to find an optimal ROFd value. An ROFd value is optimal when it satisfies the following conditions used as the conditions for an update.

<1> An increment (+) has occurred A times or more at the ROFd value.

<2> When the ROEd value has been most frequently incremented (+), whereas the presently used ROF value has been incremented (+) B times or less.

Arbitrary values may be set as the values A and B according to the predetermined statistical count.

When the values A and B are set at 5 and 2, respectively, in the example shown in FIG. 20, an ROFd value of 26 is selected as an optimal value from the condition <1>. That is, the value is selected as the ROF value to be used in the effective pixel area. When the values A and B are set at 7 and 2, respectively, and the presently used ROF value is 22, the ROFd value of 26 is adopted again from the condition <2>.

The condition <1> means that an ROFd value smaller than a target value by one is to be adopted in an oscillating state.

An ROFd value is to be checked against the condition <2> when the presently used value is far apart from the target value and when the condition <1> cannot be satisfied by controlling the ROFd value the predetermined statistical number of times. That is, convergence cannot be achieved even after a great number of attempts if it is started from the ROF value of 22, the condition <2> is provided as an auxiliary alternative to avoid such a situation.

When an optimal value is extracted from a history of past attempts using conditions for determination, the most stable ROFd value can be selected in an oscillating state.

Convergence may alternatively be achieved at an ROFd value greater than a target value by one instead of an ROFd value smaller than the target value by one by acquiring statistical counts of decrements instead of counts of increments.

An optimal value may be smaller or greater than a target value by one depending on the characteristics of the A-D converters used.

In the example shown in FIG. 19, since a target value is set in a region where converted pixel reset levels have a relatively great magnitude, convergence is achieved at a value smaller than the target value by one in order to prevent the resultant ROF value from exceeding the target value.

It is advantageous to set a somewhat greater target value than setting it in the middle of the conversion range because such a target value allows a longer settling time to be accommodated for the voltage RAMP and signals output from pixels.

<9. Exemplary Circuit of Signal Processing System>

FIG. 21 is a diagram showing an example of a circuit of a signal processing system for implementing the algorithm according to the embodiment of the invention.

A signal processing system 200 shown in FIG. 21 includes a DAC 201, a unit pixel 202, a comparator 203, a counter 204, a sense circuit 205, an averaging circuit 206, a comparator 207, ad an up/down counter 208.

The signal processing system 200 also includes a selector 209, an adder group 210, a threshold determination circuit 211, a cache memory 212, and a selector 213.

The DAC 201 has the function of generating a reference signal (voltage) RAMP, and it corresponds to the DAC 160 shown in FIG. 11. The DAC 201 changes the shape of the reference signal RAMP according to an ROF value.

The unit pixel 202 corresponds to the unit pixel 110A shown in FIG. 12.

The comparator 203 is an analog comparator forming part of an ADC, and it corresponds to the comparator 151 shown in FIG. 11.

The counter 152 is a counter circuit forming part of the ADC, and it corresponds to the counter 152 shown in FIG. 11.

The sense circuit 205 is a sense circuit in a system for transferring A-D converted data, and the circuit corresponds to the sense circuit 170 shown in FIG. 11.

The averaging circuit 206 has the function of calculating an average value of results of conversion of pixel reset levels, and the circuit is normally constituted by an adder.

The comparator 207 is a digital comparator for comparing the result of the average value calculation with a target value for ROF convergence, and the counter outputs an up/down signal according to the result of the comparison.

The up/down counter 208 counts the output of the counter 207.

The selector 209 and the adder group 210 form a circuit for obtaining statistics of incremental signals output from the comparator 207 for each ROFd value.

The statistic results are determined by the threshold determination circuit 211.

The cache memory 212 is a cache memory in which the ROF value used in the effective pixel area is stored. The selector 213 selects an ROFd value or the ROF value according to a timing signal.

Operations of the circuit shown in FIG. 21 will now be described with reference to the high-speed convergence algorithm shown in FIG. 14.

First, an initial ROF value is loaded.

The ROF value is stored in the cache memory shown in FIG. 21.

Next, the same initial value is set as an initial ROFd value. The ROFd value is stored in the up/down counter 208 shown in FIG. 21.

Next, results of conversion of pixel reset levels are output.

At this time, the selector 213 is controlled such that the ROFd value stored in the up/down counter 208 is passed to the RAMP wave generating. DAC 201. The results of conversion are input to the averaging circuit 206 which calculates an average value of the results.

Next, the average value is compared with the target value at the digital comparator 207, and an up/down signal is input to the up/down counter 208.

The ROFd value is thus incremented or decremented. When an up signal is generated by the comparator 207, a statistical process is performed by adders in the adder group 210 selected by the selector 209 depending on the ROFd value of interest.

When a statistical count is reached, a determination is made by the threshold determination circuit 211. If the conditions for a update are satisfied, the new ROF value is stored in the cache memory 212, and the value will be used for conversion of the effective pixel area.

The high-speed convergence mode and the low-speed convergence mode can be switched to each other only by the timing at which the selector 213 is selected.

A detection range will now be described.

It is assumed that one entire screen is used as a region in which results of pixel reset level conversion are to be detected in the high-speed convergence mode as shown in FIG. 15.

Therefore, even if an image output at pixel reset levels includes shades in the vertical direction, an average value can be accurately obtained including the shades.

However, an effective image cannot be output in the high-speed convergence mode, the mode is assumed to be used only for one frame when a standby setting is cancelled or when the power supply is turned on. After that frame, the process enters the low-speed convergence mode.

In the low-speed convergence mode, as shown in FIG. 17, a region usable for detecting results of pixel reset level conversion is such a small region that the viewing angle and the frame rate will not be adversely affected, e.g., a region extending one to several rows over the VOB area.

Therefore, when an image output at pixel reset levels include shades in the vertical direction, the shades cannot be detected, and the shades can result in errors in adjusting an optimal ROF value.

Figure 22:
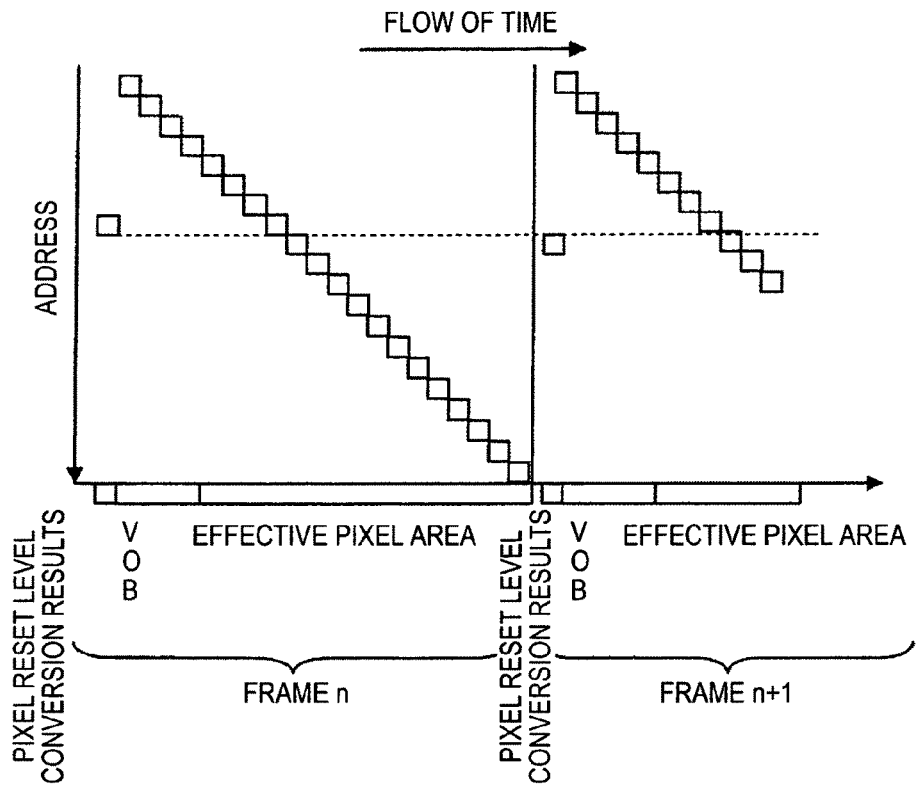
FIG. 22 is a graph for explaining a method of solving the problem of errors which can be imparted to adjustment of an optimal ROF value.

An exemplary method for solving the problem is shown in FIG. 22.

FIG. 22 is an illustration for explaining the method of solving the problem of errors which can occur when adjusting an optimal ROF value.

The horizontal axis of FIG. 22 represents frames which are shown from the beginning to the end according to a flow of time represented in time units for row accessing that is performed in the low-speed convergence mode. The vertical axis represents addresses in the vertical direction selected during the row scanning.

First, the process is started by outputting results of pixel reset level conversion.

It is not essential to start the process by accessing the pixels in the row that is physically located at the beginning of the frame. Alternatively, an arbitrary row of the frame may be elected, and control is exercised such that the vertical access of the accessed row will be incremented from one frame to another.

Figure 23:
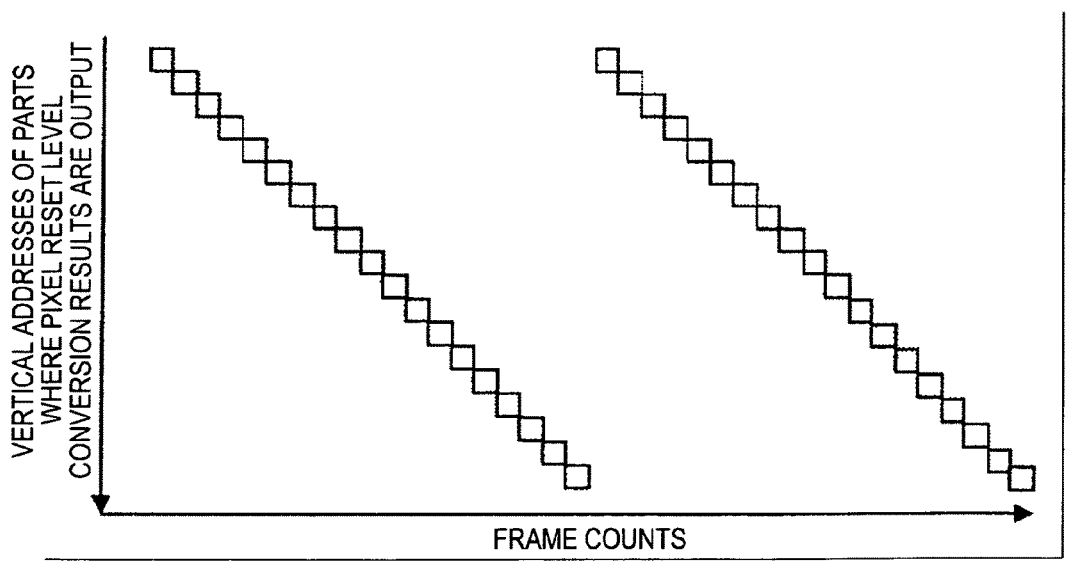
FIG. 23 is a graph representing frames in units of time along the horizontal axis thereof, the figure focusing on the vertical addresses of parts where results of pixel reset level conversion are output, in the same manner as in FIG. 22.

In FIG. 23, a flow of time similar to that represented by the horizontal axis of FIG. 22 is represented using frame periods, and the figure focuses only on the vertical addresses of the part where results of pixel reset level conversion are output.

The vertical address of the part where results of pixel reset level conversion are output is incremented by one row in each frame, and one entire frame can be detected.

A pixel readout from a CMOS image sensor is normally a destructive readout which results in dissipation of electrical charges attributable to photoelectric conversion when pixels are read out.

Therefore, when vertical addressing is controlled in an irregular manner as described above, when a row of pixels which has been accessed in the region for outputting results of pixel reset level conversion is read out again in the effective pixel region, a problem arises in that the accumulation time of the row is shifted from the accumulation time of other rows.

In the present embodiment of the invention, only reset levels of pixels are read out in the part where results of pixel reset level conversion are to be output, and only an operation of resetting the pixels are required. Thus, the pixel signal readout may be stopped after the reset operation to perform the readout operation in a non-destructive manner.

Thus, the irregular accessing method as described above can be carried out without adversely affecting the effective pixel area.

All of the above-described examples employ the digital CDS method involving the counter circuit shown in FIG. 11, and an exemplary application employing an analog CDS circuit will be described below.

<10. Another Exemplary Circuit of Signal Processing System>

Figure 24:
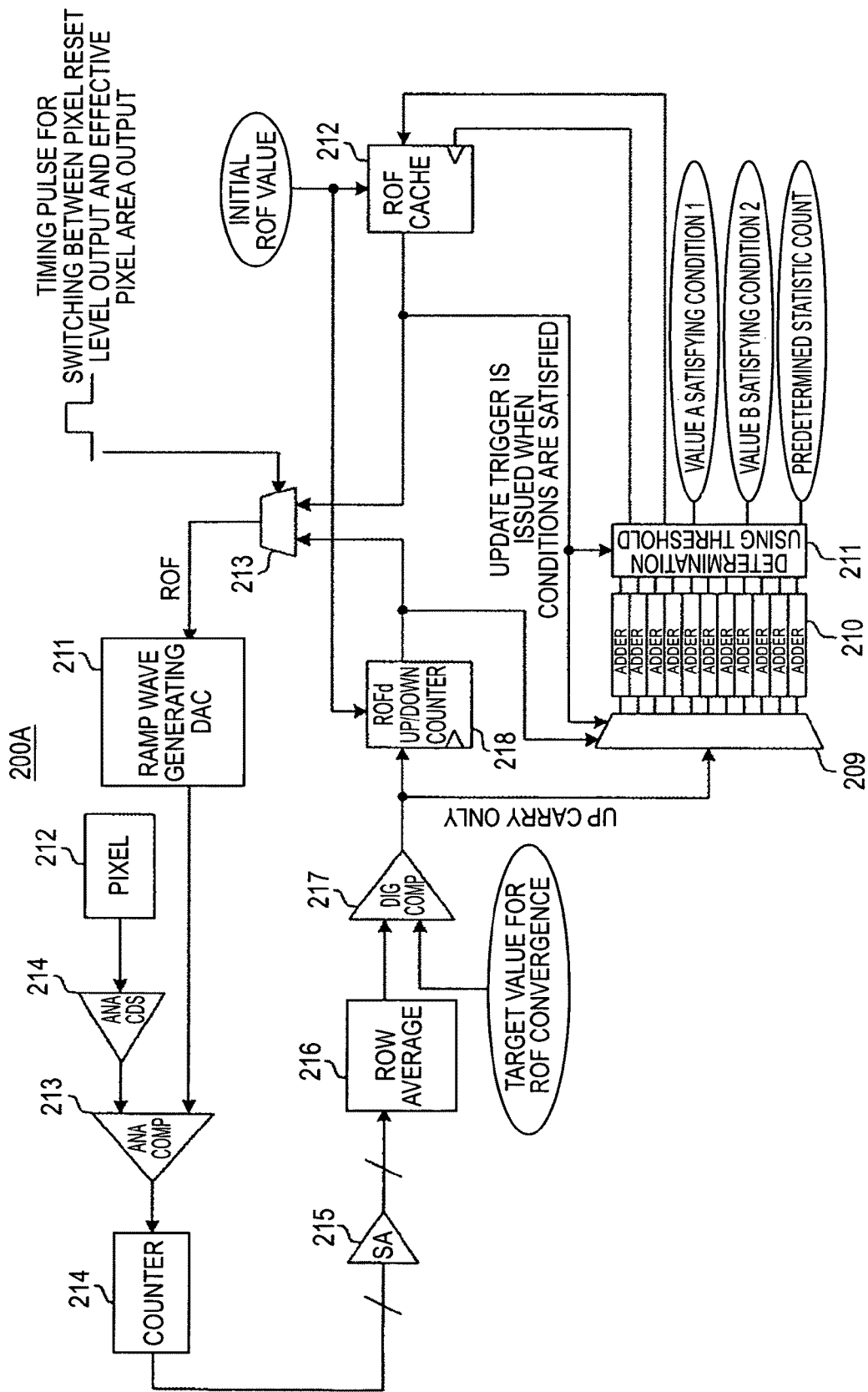
FIG. 24 is a diagram showing an exemplary circuit configuration of a signal processing system including an analog CDS circuit.

FIG. 24 is a diagram showing an exemplary circuit configuration of a signal processing system including an analog CDS circuit.

A circuit 200A shown in FIG. 24 is the same in configuration as the exemplary configuration shown in FIG. 21 except that an analog CDS circuit 214 is disposed between a pixel 202 and an analog comparator 203.

Since an analog CDS circuit is provided, a signal passed to the analog comparator is a differential signal between the level of a pixel reset signal and the level of a pixel signal output.

Figure 25:
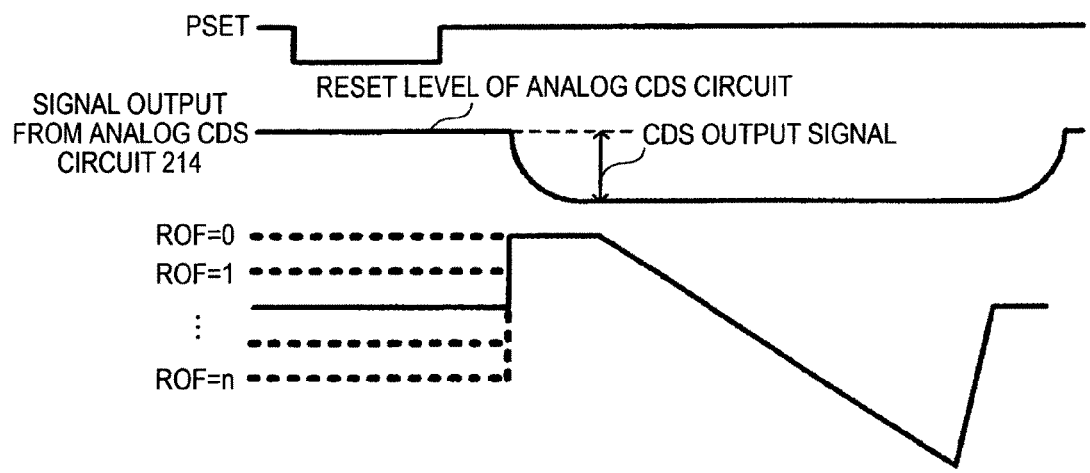
FIG. 25 is a graph showing an example of a single slope type reference signal input to an analog comparator in the circuit shown in FIG. 24.

Therefore, at an ADC provided downstream of the analog comparator 203 is required to perform A-D conversion of the difference signal only once. Thus, a reference signal RAMP input to the analog comparator 203 is a single slope type signal as shown in FIG. 25.

A signal PSET is obtained by sampling a reset level in the analog CDS circuit 214.

In this case, what is adjusted using an ROF value is offsets of A-D converted values which have been subjected to analog CDS rather than offsets of A-D converted values of pixel reset levels.

That is, when an analog CDS circuit is provided, the black level of a sensor output can be adjusted using an application of the present embodiment of the invention.

When the present circuit is used as a black level adjusting circuit, in the region for outputting results of pixel reset level conversion shown in FIGS. 15 and 16, an OPB region is read out to detect a black level.

In the high-speed convergence mode shown in FIG. 15, a VOPB region is continuously read out for one frame, and only an HOPB region may alternatively be used as an average value detecting area.

In the low-speed convergence mode shown in FIG. 17, the region for outputting results of pixel reset level conversion is not required and the VOPB region may be used as a region in which an average value is to be detected.

As will be apparent from the above description, the embodiment of the invention provides the following advantages.

According to the present embodiment of the invention, results of pixel reset level conversion can be always obtained in an optimal manner without being adversely affected by environmental conditions such as power supply voltage and temperature and variations of wafer processing.

Results of pixel reset level conversion can be obtained with stability in the effective pixel region regardless of the stability of a feedback circuit for automatic adjustment.

Since a control circuit for automatic adjustment can be configured to perform incremental/decremental control that is the simplest method of control, the circuit can be formed such that it will not be adversely affected by a loop gain of a feedback circuit. Thus, the control circuit can be provided with a simple design, and the circuit can have highly versatility.

A reset level to achieve the most stable pixel conversion level can be obtained by exercising simple incremental/decremental control instead of complicated control such as control involving a dead zone.

Such a mode of control can accommodate both of situations in which the follow-up speed of control has priority over stability as experienced when power supply is turned on or when a mode change takes place and situations in which stability has priority over follow-up speed as experienced when common motion pictures are imaged.

Switching between the high follow-up speed mode and the high stability mode can be made by only changing the size of the dedicated region for outputting results of pixel reset level AD conversion. It is therefore not required to provide dedicated automatic adjustment circuits associated with those modes respectively. Thus, the scale of a circuit according to the embodiment can be kept small, and a simple design can be employed.

Even when results of pixel reset level conversion include shades in the vertical direction of the screen, the shades can be automatically adjusted to optimize the results of pixel reset level conversion.

The above-described advantages can be demonstrated as they are for the adjustment of a black level of a sensor.

A solid-state imaging device have advantages as thus described can be used as an imaging device of a digital camera or a still camera.

<11. Exemplary Configuration of Camera System>

Figure 26:
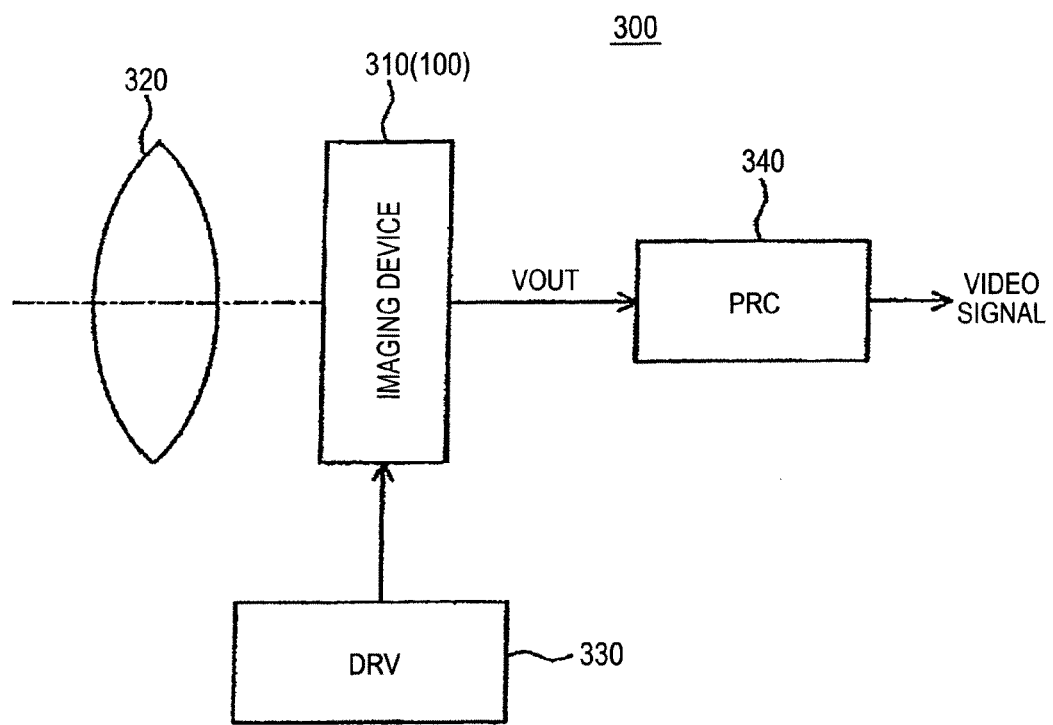
FIG. 26 is a diagram showing an exemplary configuration of a camera system employing a solid-state imaging device according to the embodiment of the invention.

FIG. 26 is a diagram showing an exemplary configuration of a camera system 300 employing a solid-state imaging device according to the embodiment of the invention.

As shown in FIG. 26, the camera system 300 includes an imaging device 310 which may be a solid-state imaging device 100 according to the embodiment of the invention.

The camera system 300 includes an optical system for guiding incident light to a pixel region of the imaging device 310 (for forming an image of an object), e.g., a lens 320 for forming an image of incident light (image light) on an imaging surface.

The camera system 300 includes a driving circuit (DRV) 330 for driving the imaging device 310 and a signal processing circuit (PRC) 340 for processing signals output from the imaging device 310.

The driving circuit 330 includes a timing generator (not shown) for generating various timing signals including a start pulse and a clock pulse for driving circuits in the imaging device 310. The circuit drives the imaging device 310 according to a predetermined timing signal.

The signal processing circuit 340 performs signal processing such as CDS (correlated double sampling) on signals output from the imaging device 310.

An image signal processed at the signal processing circuit 340 is recorded in a recording medium such as a memory. A hard copy of image information recorded in the recording medium is made by a printer or the like. An image signal processed by the signal processing circuit 340 is displayed as a motion picture on a monitor constituted by a liquid crystal display or the like.

As described above, a camera having high fidelity can be obtained by incorporating a solid-state imaging device 100 as described above as an imaging deice 310 in an imaging apparatus such as a digital still camera.

The present application contains subject matter related to that disclosed in Japanese Priority Patent Application JP 2010-035416 filed in the Japan Patent Office on Feb. 19, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel section formed by a matrix-like array of a plurality of pixels performing photoelectric conversion; and
a pixel signal readout section configured to read out signals from the pixel section in units for reading, each unit for reading comprising multiple ones of the plurality of pixels, wherein
the pixel signal readout section includes
a column-parallel type ADC group formed by a plurality of analog-digital converters (ADCs) for performing A-D conversion of signals read out from the pixel section, and
a signal processing system configured to set initial offset values for the respective conversion ranges of the ADCs,
wherein, the pixel signal readout section is configured to automatically determine an optimal initial offset value based on a test value and to iteratively adjust the test value by, in each iteration:
obtaining digital reset values for a group of the plurality of pixels by performing A-D conversion of pixel reset levels of the group,
obtaining an average reset value for the iteration by averaging the digital reset values of the group,
automatically adjusting the test value based on the average reset value for the iteration such that the average reset value of a next iteration approaches a predetermined target value.

2. The solid-state imaging device according to claim 1, wherein the device outputs an image frame including a dedicated area and an other area, wherein the dedicated area of the image frame includes the digital reset values for the group of pixels but not pixel signal values, and wherein the other area includes pixel signal values, and
the signal processing system exercises control such that different initial offset values for the ADC conversion range will be used in the dedicated area and the other area.

3. The solid-state imaging device according to claim 2, wherein the iterative adjustment of the test value includes, in each iteration, comparing the average reset value for the iteration and the predetermined target value, and incrementing or decrementing the test value by a predetermined amount based on the results of the comparison, and
the incrementing or decrementing of the test value is performed in each iteration such that the average reset values of the iterations converge to the predetermined target value without including any dead zones.

4. The solid-state imaging device according to claim 3, wherein the signal processing system is configured to record a history of any incrementing and decrementing of the test value for an arbitrary period and determine the optimal initial offset value based the history.

5. The solid-state imaging device according to claim 3, wherein the pixel signal readout section is configured to perform the iterative adjustment of the test value in two or more different modes having different converging times for the average reset values of the iterations to converge to the predetermined target value.

6. The solid-state imaging device according to claim 5, wherein the signal processing system controls the difference between the converging times by varying the size of the dedicated area.

7. The solid-state imaging device according to claim 1, wherein the device outputs an image frame including a dedicated area and an other area, wherein the dedicated area of the image frame includes the results of A-D conversion of pixel reset levels for the group of pixels but not pixel signal values, and wherein the other area includes pixel signal values, and
the physical positions of pixels of the group of pixels corresponding to the dedicated area vary from one frame to another.

8. The solid-state imaging device according to claim 1, wherein
the pixel signal readout section includes an analog CDS circuit; and
the signal processing system includes the function of automatically adjusting the input offset value for the conversion range of the ADCs such that a black level of a pixel signal output value will fall within the AD conversion range.

9. The solid-state imaging device according to claim 8, wherein the device outputs an image including a dedicated area in which results of A-D conversion of pixel reset levels are output, and
the signal processing system exercises control such that different offset values for the ADC conversion range will be used in the dedicated area and an other area.

10. The solid-state imaging device according to claim 1, wherein each of the ADC includes:
a comparator disposed in association with a column of pixels, the comparator determining the electric potential of a readout signal by comparing the electric potential with a reference voltage and outputting the result of the determination; and
a counter operating under control exercised by the output of the comparator, the counter counting the time of comparison performed by the comparator associated therewith.

11. A camera system comprising:
the solid-state imaging device of claim 1; and
an optical system forming an image of an object on the imaging device.

12. A solid-state imaging device comprising:
a plurality of pixels two-dimensionally arrayed and configured to perform photoelectric conversion;
a readout section configured to read out signals from the plurality of pixels one read-out unit at a time, each read-out unit comprising N>1 of the plurality of pixels, the readout section including N analog-to-digital converters (ADCs) for performing analog-to-digital conversion (A-D conversion) on the signals based on a ramp voltage having a predetermined A-D conversion ranges; and
a signal processing system configured to set a baseline offset of the ramp voltage;
wherein the readout section and the signal processing section are configured to automatically determine an optimal baseline offset of the ramp voltage based on a test value and to iteratively adjust the test value by, in each iteration:
obtaining digital reset values for a group of the plurality of pixels by performing A-D conversion of pixel reset levels of the group using a baseline offset of the ramp voltage that is based on the first value, the reset signals being signals read out from the group incident to a reset operation,
obtaining an average reset value for the iteration by averaging the digital reset values of the group,
comparing the average reset value for the iteration to a predetermined target value, and
automatically adjusting the test value in a direction that would cause the average reset value of a next iteration to approach the predetermined target value.

13. The solid-state imaging device of claim 12,
wherein, which ones of the plurality of pixels are included in the group varies from frame to frame.

14. The solid-state imaging device of claim 12,
wherein the readout section and the signal processing system are configured to use at least two modes for automatically adjusting the baseline offset of the ramp voltage, and
in a first mode the number of pixels included in the group is greater than the number of pixels included in the group in a second mode.

15. The solid-state imaging device of claim 14,
wherein in the first mode the group includes all of the plurality of pixels.

16. The solid-state imaging device of claim 14,
wherein in the second mode the group consists of pixels of one read-out unit.

17. The solid-state imaging device of claim 16,
wherein, in the second mode, the read-out unit whose pixels are included in the group varies from frame to frame.

18. The solid-state imaging device of claim 14,
wherein the signal processing system is configured to use the first mode when the solid-state imaging device powers-up or resumes from a stand-by mode, and to use the second mode during imaging operations.

19. The solid-state imaging device of claim 12,
wherein the signal processing system is configured to adjust a second value based on a history of adjustments of the first value, and
wherein the baseline offset of the ramp voltage that is used for A-D conversion of signals from those of the plurality of pixels other than the group is based on the second value, the adjustment of the second value corresponding to said determining the optimal baseline offset.

20. The solid-state imaging device of claim 19,
wherein the signal processing system adjusts the first value by incrementing or decrementing the first value by a predetermined amount one frame at a time, and
the signal processing system adjusts the second value after the first value has oscillated between two values a predetermined number of times such that the second value equals one of the two values that the first value has oscillated between.

21. The solid-state imaging device of claim 12,
wherein, in each frame, the group outputs reset signals but not pixel signals and those of the plurality of pixels other than the group output reset signals and pixel signals.

22. A camera system comprising:
the solid-state imaging device of claim 12; and
an optical system configured to form an image of an object on the solid-state imaging device.

* * * * *